United States Patent [19]
McGreggor et al.

[11] Patent Number: 5,963,201
[45] Date of Patent: *Oct. 5, 1999

[54] COLOR PROCESSING SYSTEM

[75] Inventors: Keith McGreggor, San Jose; Christopher M. Yerga, Sunnyvale; David Van Brink, Santa Cruz, all of Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/711,082
[22] Filed: Sep. 9, 1996

Related U.S. Application Data

[63] Continuation of application No. 08/392,413, Feb. 22, 1995, abandoned, which is a continuation of application No. 07/881,159, May 11, 1992, abandoned.

[51] Int. Cl.[6] .................................................. G06F 15/00
[52] U.S. Cl. ............................ 345/326; 345/88; 345/186; 345/431
[58] Field of Search ............................ 345/326, 88, 186, 345/431

[56] References Cited

U.S. PATENT DOCUMENTS

| | | | |
|---|---|---|---|
| 4,500,919 | 2/1985 | Schreiber | 358/78 |
| 4,639,770 | 1/1987 | Jung et al. | 358/76 |
| 4,719,503 | 1/1988 | Craver et al. | 358/12 |
| 4,751,535 | 6/1988 | Myers | 346/157 |
| 4,839,722 | 6/1989 | Barry et al. | 358/80 |
| 4,843,573 | 6/1989 | Taylor et al. | 395/131 |
| 4,875,032 | 10/1989 | McManus et al. | 340/703 |
| 4,941,038 | 7/1990 | Walowit | 358/80 |
| 4,945,406 | 7/1990 | Cok | 358/80 |
| 4,985,853 | 1/1991 | Taylor et al. | 345/431 |
| 5,003,299 | 3/1991 | Batson et al. | 340/703 |
| 5,065,234 | 11/1991 | Hung et al. | 358/523 |
| 5,073,818 | 12/1991 | Iida | 358/80 |
| 5,243,414 | 9/1993 | Dalrymple et al. | 358/500 |
| 5,309,257 | 5/1994 | Bonino et al. | 358/504 |

OTHER PUBLICATIONS

Frank Gruen et al., "Optical Radiation Measurements", vol. 2, Color Measurements, Academic Press, 1980. pp. 290–335.
Eric Walowit et al., "Spectrophotometric Color Matching Based on two Constants Keebelka–Munk Theory", John Wiley & Son Inc., 1988, pp. 358–362.
William B. Cowan, "An Inexpensive Scheme for Calibration of a Color Monitor In Terms of CIE Standards Coordinates", Computer graphics, vol. 17, No. 3, 1983, pp. 315–321.
Engeldrum, Four Color Reproduction Theory for Dot Formed Imaging Systems, Journal of Imaging Technology, vol. 12, No. 2, Apr. 1986, pp. 126–130.
A Planning Guide for Developers, Kodak Photo CD System, May, 1991, pp. i and 1–25.

*Primary Examiner*—Ba Huynh
*Attorney, Agent, or Firm*—Burns, Doane, Swecker & Mathis, L.L.P.

[57] ABSTRACT

A system for processing color information is based on carrying with color data, an indicator of the color space in which the data is represented. In this manner, the system is enabled to process color data from a variety of sources independent of the color space of the sources, because it is able to respond to the color space of a particular color value perform the necessary transformations to operate within any other arbitrary color and color space combination. The system provides for manipulating or combining colors independent of the source and destination color spaces. Also, the system operates on a per color component basis in user selected working color space, independent of the color space of the input or destination devices.

46 Claims, 19 Drawing Sheets

TRC for a typical CRT monitor

TRC for a printer

PRESERVE SATURATION

PRESERVE LIGHTNESS

COLOR PROCESSING SYSTEM

This application is a continuation of application Ser. No. 08/392,413, filed Feb. 22, 1995, now abandoned which is a continuation of prior application Ser. No. 07/881,159, filed May 11, 1992, now abandoned.

CROSS-REFERENCE TO RELATED APPLICATION

The present application relates to U.S. patent application entitled COLOR MATCHING APPARATUS AND METHOD, Ser. No. 07/854,309, filed Mar. 19, 1992, which was owned at the time of invention, and is currently owned by the same assignee.

FIELD OF THE INVENTION

The present invention relates to computer systems for processing color information; and more particularly to methods and apparatus for specifying and manipulating colors in a computer system.

BACKGROUND OF THE INVENTION

Traditionally, computer systems have used the red, green, blue (RGB) format for specifying and manipulating color in color graphics systems. Basically, the data consists of three components which indicate the value of energy for the red, green, and blue electron guns on a color monitor. The actual colors generated in response to a given value stored in a computer vary from monitor to monitor. Thus, RGB data is inherently ambiguous.

The basis for this data structure arose out of convenience for generating the necessary data for video monitors. However, people typically do not think in RGB color. For instance, it is not intuitive that a light blue color consists of 50% red, 50% green, and 100% blue.

Further complexities are introduced by the fact that some color graphics systems may require other color data structures. For instance, a color data structure known as CMYK, for cyan, magenta, yellow, and black, has been used to characterize the colors on many types of printers. Therefore, computer users were required to understand and use the CMYK along with the RGB formats for specifying color. This results often in colors being displayed on a monitor in the RGB format not matching the colors actually printed in the CMYK format, and vice versa.

Accordingly, it would be desirable to provide a color graphics system for processing color information which provides greater flexibility to computer users.

SUMMARY OF THE INVENTION

The present invention provides a system for processing color information based on carrying with color data, an indicator of the color space in which the data is represented. In this manner, the system is enabled to process color data from a variety of sources independent of the color space of the sources, because it is able to respond to the color space of a particular color value, and perform the necessary transformations to operate within any other arbitrary color and color space combination.

Furthermore, the present invention provides a technique for manipulating or combining colors independent of the source and destination color spaces, and which operates on a per color component basis. This vastly expands the capability, along with the flexibility for programmers, of the color processing system.

According to one feature, the present invention provides a method for processing color information which comprises:

specifying a source color in a data structure including a source color space and data packing format and source color data indicating components in the source color space;

specifying a destination in a data structure including a destination color space and data packing format; and computing a resultant color data structure in response to the source color data, the source color space, and the destination color space, wherein the resultant color data structure includes the destination color space and the resultant color data indicating components in the destination color space of a resultant color.

The step of computing may include providing a color operator which specifies a function and a working color space, then converting the source color data into a working color data structure having a working color space and working color data indicating components of the color in the working color space. The function for operating on the working color data is executed. Then, the working color data is converted into the resultant color data structure in the destination color space. The operator, in a preferred system, specifies functions which operate on a per component basis in the working color space.

By providing the capability to manipulate color information having an arbitrary source color space in a known working color space, a computer user can become familiar with a working color space and utilize that working color space to perform operations on a given color with results that are easily understandable to the user. After performing the operation, the data is then reconverted into a destination color space which, again, may be arbitrary.

In another aspect of the present invention, the system is provided with more than one input source colors, and the operator operates on a combination of the input source colors. The input source colors may have the same or different color spaces. This also provides the ability to perform transfer operations in which a source color is combined with a destination color to generate a new destination color. This corresponds to taking an image already being displayed on the screen and overwriting it with a new image, in a manner which does not completely destroy the data specifying the original image.

The present invention can also be characterized as a computer operating system for processing color data which comprises a color data structure that identifies a color. The color data structure includes a color space, a data packing format which matches the buffers for storing the color data, color data indicating the components of the color in the color space, and a color profile which includes a specification of components of primary colorants in the color space, and tonal reproduction curves, where applicable, for calibrating color data with an actual device.

The color spaces are selected from a set of color spaces. The set includes a first subset of algorithmic color spaces for which color data includes the components within a color coordinate system of a color, and a second subset of indexed color spaces for which the color data includes a pointer to an entry in a list, where entries in the list comprise data indicating components within a color coordinate system of respective colors.

The architecture is further characterized by a color processing system which includes a color matching module and a color combining module, both of which are responsive to the color component data and color space indicators for operating on input colors to produce resultant colors.

A further aspect of the present invention is the ability to combine or otherwise operate on colors on a per component basis. The system provides for testing color data on a per component basis to determine whether the components satisfy range conditions, such as minimum and maximum values. The testing for satisfying a range condition is provided on both the inputs of the color processing module, and on the resultant values generated. The testing may be used to clamp the tested color data structure to the specified maximum and minimum, or to abort a given process in the event the range test is not satisfied.

Also, the color processing means provides for the use of filter matrices for filtering color data supplied at the input to the processing module, and for filtering color data generated as a result of a specified operation. The filter matrix includes a scale factor for each component of the color data, an offset factor for each component of the color data, and provides for computing the value of a component of resultant color in response to a mixture of other component values of a color.

Furthermore, the input color data after filtering, is supplied to an arithmetic/logic module, which combines the color data according to specified operators to generate intermediate data. The intermediate data is then filtered and tested for range conditions in order to generate a final output color.

As can be seen, the provision for a color processing system which associates a color space with color data and provides for the conversion of information specifying a color from one color space to another enables a wide variety of color processing techniques.

The color processing system thus handles colors expressed in any format; allows for translation of colors between formats with color matching, when necessary; provides for translations of color "just in time"; and allows applications to operate without knowledge of the source or destination spaces to be utilized in a real system.

Other aspects and advantages of the present invention can be seen upon review of the figures, the detailed description, and the claims which follow.

DESCRIPTION OF THE PREFERRED EMBODIMENTS

A detailed description of a preferred embodiment of the present invention is provided with respect to the figures.

I. OVERVIEW

Figure 1:
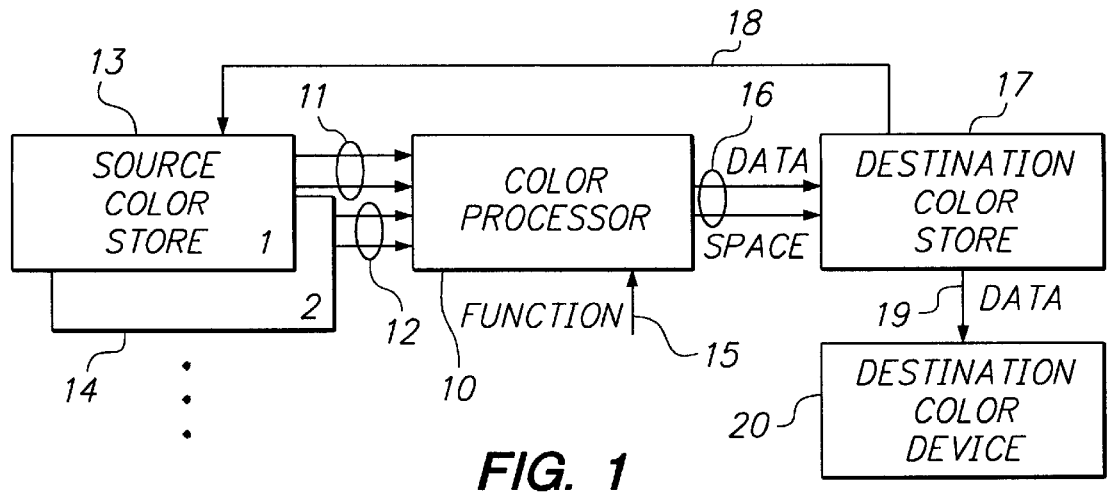
FIG. 1 is a schematic block diagram of a color processing system according to the present invention.

In FIG. 1, a color processing system is illustrated. The color processing system includes a color processor 10. The color processor includes source color inputs 11, 12 from respective source color stores 13, 14. There may be any number of source color stores supplying source input colors to the source color processor 10 according to the present invention. The color processor 10 also includes a function code input 15 by which an operation for the color processor is specified. The color processor generates a resultant color on lines 16 for supply to a destination color store 17. The destination color store 17 may be coupled in a recursive manner as indicated by the feedback arrow 18 as a source color for the color processor 10. The data in the destination color store 17 is supplied across line 19 to a destination color graphics device 20.

The source and destination stores 13, 17 may be structured in any storage format. For instance, the source store 13 may have a bit map frame buffer storing 16 bits per pixel identifying three color components, while the destination store 17 has a bit map frame buffer storing 32 bits per pixel identifying four (or any other number) color components. Alternatively, one or more of the stores 13, 17 may store an index value of 8 bits (or other number) per pixel, which maps into a look up table in another format.

As represented by the two lines for each input in the figure, the source color inputs 11 and 12 are supplied in a data structure which includes the color space, and the components of a color in the color space. Similarly, the output data structure 16, as illustrated in the figure, includes the component data as well as the color space of the destination.

Figure 2:
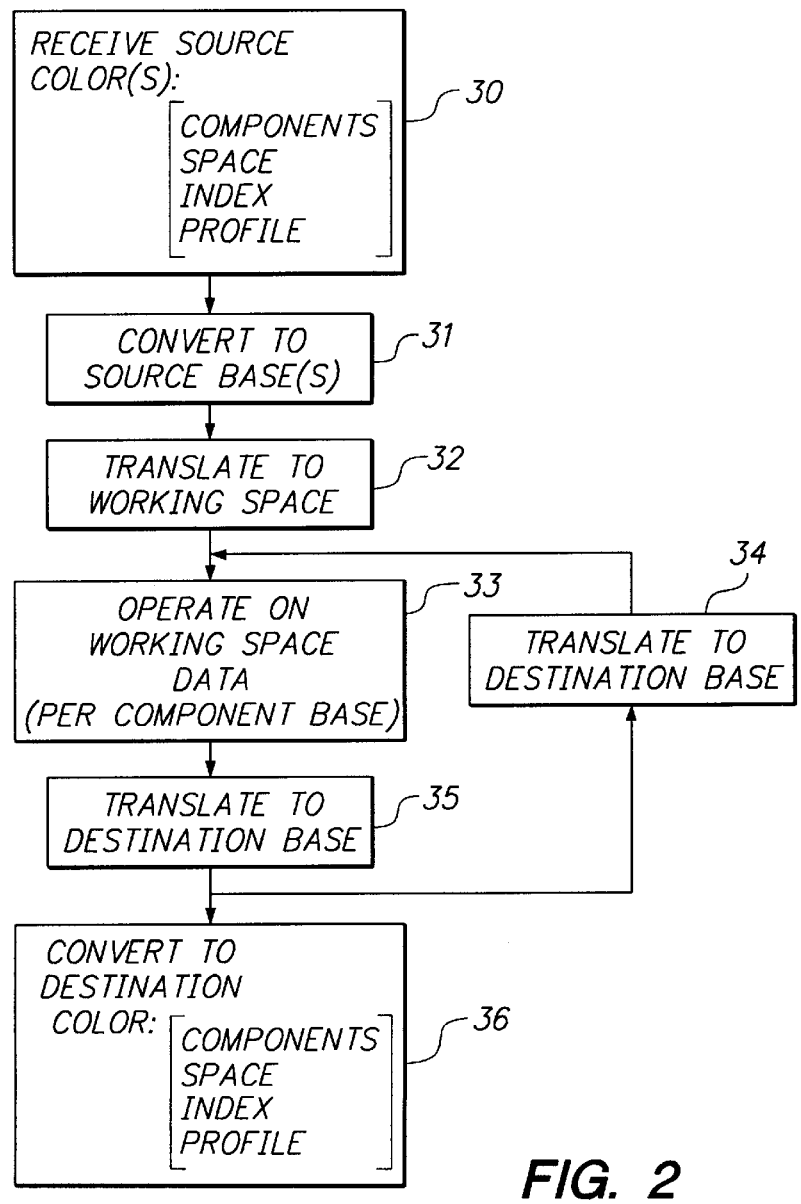
FIG. 2 is a functional diagram of a color processing system according to the present invention.

FIG. 2 illustrates a functional diagram of the color processor 10 of FIG. 1. The color processor 10 includes an input module 30 which receives the source color or colors. The source color or colors are provided in a data structure which consists of the color space, the components of the color in the color space, an indicator of whether the color space is an indexed space, and the color profile of the color space. More information about color spaces, indexed color spaces, and profiles is provided below with respect to a specific example of a color processing system according to the present invention.

From the input module 30, the source color or colors are provided to a convert to source base module 31. This module 31 facilitates organization of the wide variety of color spaces available into a set of base color spaces. The base color spaces in a preferred system include the RGB family, the XYZ family, the CMYK family, and the GRAY family. Color spaces which may fall within the RGB family include, for instance, the HSC space, the HLS space, the YIQ space, the alpha-RGB space, and various data packing formats for the various spaces. All of these color spaces may be easily translated into an RGB format based on well known translation formulas. Similarly, the XYZ family is based on the CIE color spaces, including xyY, L*U*V*, and L*a*b*. There also may be indexed color spaces for which module 31 includes respective lists of color component data for indexed colors. More details about color spaces and color families is set out below with regard to a specific example of a color processing architecture.

After converting the input color data into a base color space, the input color data is translated into a working color space in module 32. The working color space is specified by the function codes supplied to the color processing system. This module 32 allows for translating source colors having arbitrary color spaces and color formats into a common working color space and format. At this point, the color processor includes a first module 33 for operating on the working space data and a second module 34 for performing a straight translation to a destination base family.

The translation module 34 may include a color matching algorithm, such as described below. [in the above cross-referenced application entitled COLOR MATCHING APPARATUS AND METHOD.] Alternatively, if the working space and the destination space have the same base family, or do not have different color profiles, then no color matching may be necessary and a straight arithmetic translation according to well known formulas may be carried out in the translation module 34.

In the module 33, the working color data is operated on according to an operator supplied as input to the color processing system. This color data can be operated on a per component basis and in a working space specified by the user.

In the next module 35, the working data after operation in module 33 is translated into a destination base family. From block 35, or block 34, depending on the operation performed by the color processing system, the data is supplied to the converter 36, which converts the data from the destination base family to the final destination color structure having components, space, index flag, and profile, as described in more detail below.

II. EXAMPLE COLOR DATA STRUCTURE

Figure 3:
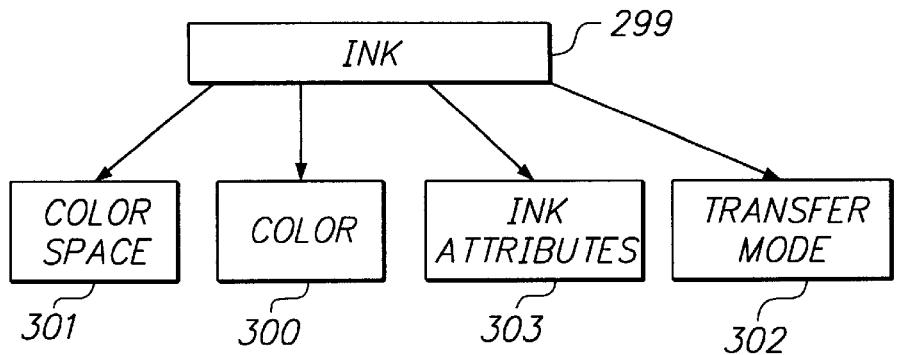
FIG. 3 is a conceptual block diagram of a color processing architecture according to the present invention.

In FIG. 3, an architecture for a computer operating system for processing color is described. This system takes advantage of the functional components of FIGS. 1 and 2 according to a preferred implementation.

According to one example of an operating system according to the present invention, an ink, as shown schematically in FIG. 3, is a description of the colors used to draw a shape. An ink 299 contains a color 300, a color space 301, and a transfer mode 302. The ink 299 may also include ink attributes 303.

A. Color Spaces

A color space is a method of specifying a color from a number or a set of numbers. An algorithmic color space is one in which the derivable colors are related by an algorithm. An indexed color space is a list of colors. Each color in an indexed color space may be defined by a different algorithmic color space. A compound color space is an algorithmic color space with custom parameters for colorProfile and the underColorRemoval attribute described below.

```
typedef enum {
        noSpace,
        rgbSpace,
        rgbaSpace,
        cmykSpace,
        hsvSpace,
        hlsSpace,
        cieSpace,
        xyzSpace,
        luvSpace,
        labSpace,
        yiqSpace,
        ntscSpace = yiqSpace,
        palSpace = yiqSpace,
        secamSpace,
        digitalVideoSpace,
        graySpace,
        grayaSpace,
        rgb16Space,
        rgb32Space,
        argb16Space,
        argb32Space,
        cmyk16Space,
        cmyk32Space,
        graya16Space,
        graya32Space = grayaSpace
} colorSpaces;
```

The colorSpaces listed above are each represented by a 16 bit word in which the top 8 bits identify a packing format for component data in the space and the bottom 8 bits uniquely specify the algorithmic space. The packing format will correspond to the structure of the frame buffer for source or destination devices as described above with respect to FIG. 1.

The algorithmic color spaces supported in a preferred example are listed in the typedef enumeration above. These spaces can be grouped into three classes: those based on RGB, those that directly specify color in a universal fashion (CIE spaces), and those based on luminance (GRAY spaces).

1. RGB-Based Color Spaces

Figure 4:
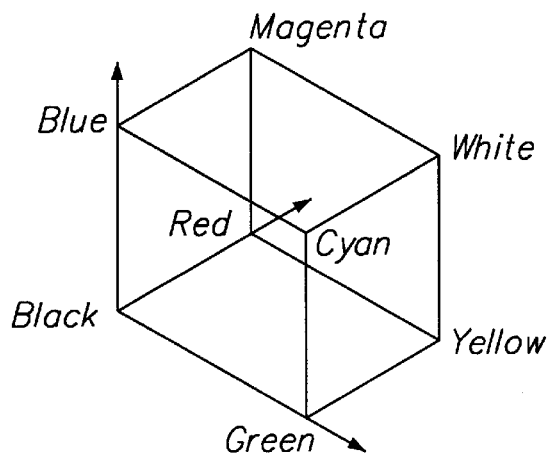
FIG. 4 is a schematic representation of an RGB based color space.

RGB-based color spaces are the most commonly used color spaces in computer graphics, primarily because they directly support most monitors and printing devices. Any color expressed in an RGB-based color space is some mixture of three primaries: red, green, and blue. Usually, an RGB-based color space can be visualized as a cube, as shown in FIG. 4, with red, green, blue, cyan, magenta, yellow, black, and white at the corners.

The supported RGB-based color spaces, in one example, are: rgbSpace, rgbaSpace, rgb16Space, rgb32Space, argb16Space, argb32Space, hsvSpace, hlsSpace, cmykSpace, cmyk16Space, cmyk32Space, yiqSpace, secamSpace, and digitalVideoSpace.

RgbSpace, rgb16Space, rgb32Space, argb16Space, and argb32Space directly implement a mixing of red, green, and blue to form a color. RgbaSpace, argb16Space, and argb32Space contain alpha values used by transfer modes for composite drawing operations. In rgbSpace, the three components are separate and can range from 0 to 65,535 (16 bits of data). Rgb16Space, rgb32Space, rgba16Space, and rgba32Space fit into a single number, as shown in FIGS. 5A–5D, respectively.

Only the bottom 16 bits of rgb16Space and rgba16Space are actually stored in the color.

Figure 6:
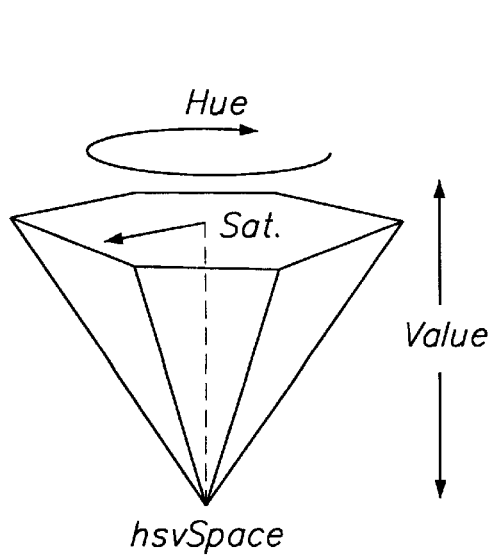
FIG. 6 is a schematic diagram of the HSV color space.
Figure 7:
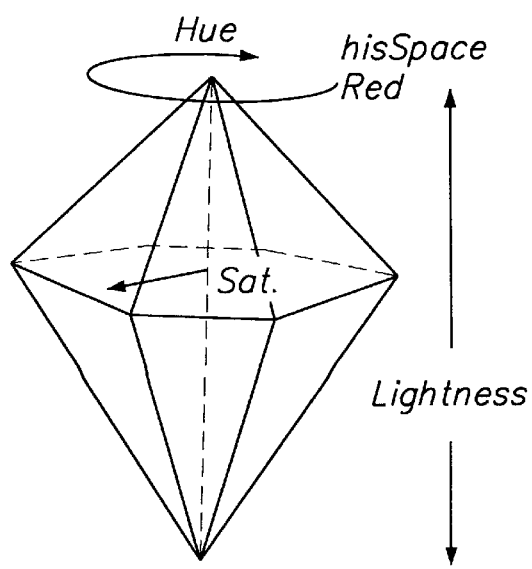
FIG. 7 is a schematic diagram of the HLS color space.
Figure 5A:
FIGS. 5A–5D illustrate the format of the component data in representative RGB type color spaces.
Figure 5B:
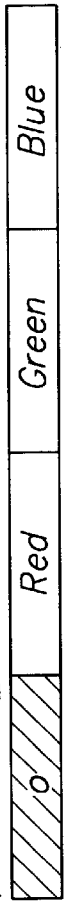
Figure 5C:
Figure 5D:
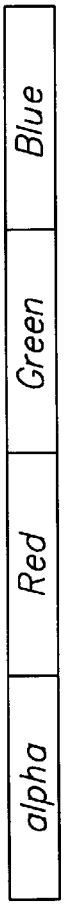

HsvSpace and hlsSpace are modifications of RGB that allow colors to be described in terms more natural to an artist. "HSV" means "hue, saturation, and value," whereas "HLS" stands for "hue, lightness, and saturation." The two spaces can be thought of as being single and double cones, as shown in FIGS. 6 and 7, respectively.

The range of all three components of a color in hsvSpace or hlsSpace can vary from 0 to 65,535 (16 bits of data). The hue value is an angular measurement. A hue value of 0 indicates the color red; the color green is at a value of 21,845 (corresponding to 120°) and the color blue is at 43,690 (240°). For both hsvSpace and hlsSpace, a saturation value of 0 means that the color is some gray: a saturation value of 65,535 means that the color is at maximum "colorfulness" for that hue angle and brightness. In hsvSpace, a value of 65,535 means that the color is at its brightest. in hlsSpace, however, the brightest, most intense color occurs at a lightness value of 32,768, due to the nature of the algorithm.

Figure 8A:
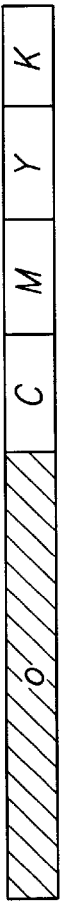
FIGS. 8A and 8B illustrate the format of the component data in representative CMYK color spaces.
Figure 8B:
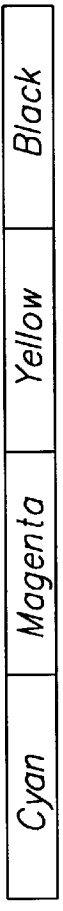

CmykSpace, cmyk16Space, and cmyk32Space may be used to model the way ink builds up in printing. "CMYK" refers to cyan, magenta, yellow, and black. The process of deriving the cyan, magenta, yellow, and black values from a color expressed in rgbSpace is described under the heading "Undercolor Removal". In cmykSpace, the value of any component varies from 0 to 65,535 (16 bits of data). In cmyk16Space and cmyk32Space, all four components fit into a single number, as shown in FIGS. 8A and 8B, respectively.

Only the bottom 16 bits of cmyk16Space are stored in the color.

YiqSpace, secamSpace, and digitalVideoSpace are sometimes called video color spaces. Each of these color spaces is based on the way RGB data is broken down for color television. To convert an RGB color into yiqSpace, the following information is used:

Y=0.30*red+0.59*green+0.11*blue;

I=red−Y;

Q=blue−Y;

Notice that the Y channel is calculated the way the luminance of an RGB color is calculated. This is because the Y channel is the only channel used in black and white television. The I and Q channels are called color difference channels: the y channel is split between them. The notation "I" and "Q" stand for "in phase" and "in quadrature," respectively, referring to the method by which all of the channels are combined into a signal for broadcast.

Figure 9:
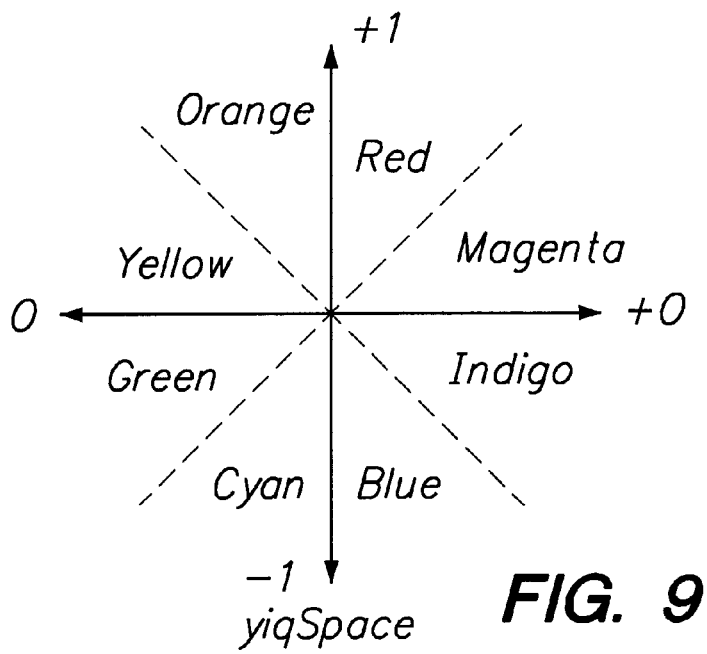
FIG. 9 is a schematic illustration mapping colors into the I and Q dimensions of the YIQ color space.

Each of the three components of yiqSpace fit into 16 bits of data. The Y component can vary from black (at a value of 0) to 65,535, denoting full luminance. I and Q are normally signed values, so they are centered about 32767. FIG. 9 illustrates how colors map into the I and Q dimension of yiqSpace.

SecamSpace and digitalVideoSpace are slight modifications to yiqspace. SECAM stands for Systeme Electronique Couleur Avec Memoire. digitalVideoSpace corresponds to the signal layout used by the component digital recording standard, sometimes known as D-1 or 4:2:2 digital (the "4:2:2" notation refers to the ratio of the sampling frequencies of luminance components to sampling the color difference components). They are related to yiqSpace by the following formulae.

For secamSpace:

secamI=1.9*I;

secamQ=1.5*Q;

For digitalVideoSpace:

dI=0.713*I;

dQ=0.564 *Q;

2. Universal Color Spaces

Some color spaces allow color to be expressed in a device-independent (universal) way. The supported universal color spaces in this example are: xyzSpace, cieSpace, yuvSpace, luvSpace, and labSpace. All of these color spaces are derived from xyzSpace.

The xyzSpace color space allows colors to be expressed as a mixture of three tristimulus values, X, Y, and Z. The term tristimulus comes from the notion that the way color is perceived results from the retina of the eye responding to three types of stimuli: one that affects the cones, one that affects the rods, and one that affects both. After experimentation, the Commission Internationale d'Eclairage (CIE) set up a hypothetical set of primaries, XYZ, that correspond to the way the eye's retina behaves. Because these primaries are based on perceived color, they map all visible light into a positive mixture of X, Y, and Z.

Generally, the mixtures of X, Y, and Z used to describe a color are expressed as percentages ranging from 0% up to, in some cases, just over 100%. Each of the three components of a color in xyzSpace fit into 16 bits of data. The permissible range of values is 0 (0%) to 65,535 (100%).

The XYZ tristimulus values each correspond to a dimension of color sensation. The CIE defined Y so that it would correlate approximately to the apparent lightness of a color. The universal color spaces (other than xyzSpace) exist primarily to relate some aspect of color to these XYZ values.

CieSpace expresses the XYZ values in terms of "chromaticity coordinates". This space is sometimes called "xyY", due to the conventional names of the coordinates. The formula used to convert XYZ into these values is:

x=X/(X+Y+Z)

y=Y/(X+Y+Z)

Y=Y

Figure 10:
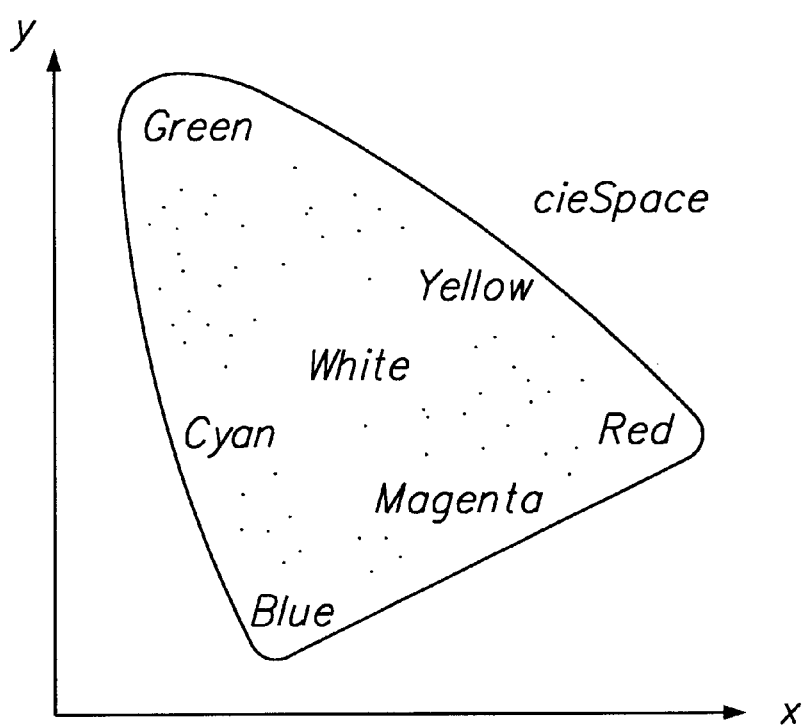
FIG. 10 is a schematic diagram of the CIE space in the x and y plane.

Note that the Z tristimulus value is "encoded" into the new coordinates. Since Y still correlates to the lightness of a color, the other aspects of the color are found in the chromaticity coordinates, "x" and "y". The layout of colors in the "x" and "y" plane is shown in FIG. 10.

The range of values possible for the "x" and "y" components of cieSpace are 0 (representing 0%) to 65,535 (representing 100%). The range of the luminance component is the same as xyzSpace.

The range of values possible in yuvSpace is identical to cieSpace. yuvspace is related to cieSpace by this formula:

$Y=Y$ $u=4*x/(-2*x+12*y+3)$ $v=9*y/(-2*x+12*y+3)$

LuvSpace and labSpace are used to represent colors relative to a reference white point. The default reference white point is called illuminant D65, and has the following chromaticities (x, y) and luminance (Y):

D65White={0.219, 0.296, 100.0};

The luminance of the default white point may be chosen to match the luminance of the white point on, for instance, an Apple 13-inch color monitor.

The formula for transforming a yuvSpace color into a luvSpace color is:

if $(Y/Y_n>0.008856)$
  $L=116.0*(Y/Y_n)^{1/3}-16.0$;
else
  $L=903.3*(Y/Y_n)$;
  $u=13.0*L*(u'-u'_n)$;
  $v=13.0*L*(v'-v'_n)$;

where $u'_n$, $v'_n$, $Y_n$ are the yuvSpace values for the reference white point.

Similarly, the formula for transforming a xyzSpace color into a labSpace color is;

if $(Y/Y_n>0.008856)$
  $L=116.0*(Y/Y_n)^{1/3}-16.0$;
else
  $L=903.3*(Y/Y_n)$
  $a=500.0*((X/X_n)^{1/3}-(Y/Y_n)^{1/3})$;
  $b=500.0*((Y/Y_n)^{1/3}-(Z/Z_n)^{1/3})$;

where $X_n$, $Y_n$, $Z_n$ are the xyzSpace values for the reference white point.

The primary benefit of using luvSpace or labSpace colors is that the perceived difference between any two colors is proportional to the geometric distance of those colors. All components have 16 bits of data. The values for the L component vary between 0 (0%) and 65,535 (100% of the luminance of the white point). The values for the other components, uv and ab, also vary between 0 and 65,535. Since uv and ab are normally signed numbers between 1.0 and −1.0, convert them into shorts with:

anUnsignedshort=((aFloat+1.0)/2)*65535.0;

You can find more information on the theories of color and the various color spaces in "Measuring Color", by R. W. G. Hunt, John Wiley & Sons, New York, 1987; and "Illumination and Color in Computer Generated Imagery", by Roy Hall, Springer-Verlag, New York, 1989.

3. Luminance-based Color Spaces

Luminance is a scale of lightness. A color is converted into luminance by approximating the physical lightness of the color. The luminance of a color expressed in RGB is calculated with this formula:

luminance=0.30*red+0.59*green+0.11*blue;

The supported luminance-based color spaces are graySpace, grayaSpace, and graya32Space. In each of these spaces, the luminance is specified by a single number whose range varies with the number of bits available. In gray8Space and graya16Space, the luminance value ranges from 0 to 255 (8 bits of data); in gray16Space and graya32Space, the value ranges from 0 to 65,535. The color black has a luminance value of 0, regardless of the color space.

B. Color Component Values

Colors are specified by a color data structure including one to four numbers (or components) and a color space. The color space translates the components of a color into the range of colors that can be specified. There are two types of color spaces: indexed and algorithmic.

Some color spaces are indexed color spaces. The color data structure specifies an index into a list of color specifications. The list can have up to 65,535 entries.

Algorithmic color spaces use an algorithm to translate the components of a color.

Colors are defined by the structure:

```
typedef struct {
    colorSpace space;
    union {
                    cmykColor cmyk;
                    rgbcolor rgb;
                    rgbacolor rgba;
                    hsvColor hsv;
                    cieColor cie;
                    yiqColor yiq;
                    unsigned short gray;
                    grayaColor graya;
                    unsigned shortindex;
                    unsigned shortpixel16;
                    unsigned longpixel32;
                    unsigned shortcomponent [4];
    } element;
} color
```

The space is defined by one of the color spaces defined above under "Color Spaces", or by an indexed color space.

Most algorithmic spaces correspond to the like named union member. Color spaces with three 16 bit components should use the RGB, hsv, cie, or yiq union members. Spaces with four 16 bit components should use the CMYK or rgba union members. The index within an indexed color space is referenced by the index union member. The grayaSpace color space uses the gray union member. The grayaSpace uses the graya union member. Color spaces for 16 bits per pixel bitmaps use the pixel 16 union member; color spaces for 32 bit per pixel bitmaps use the pixel32 union member. The component member is useful for indexing through the color one component at a time.

It is not necessary to set the color space field of a color to the same color space as the ink. The color will be converted into the ink color space before it is added to the ink.

In order to describe the color of a pixel, color spaces are associated with bitmaps. The bit depth of a bitmap imposes certain restrictions on the possible color spaces:

1, 2, 4, and 8 bits per pixel bitmaps must use indexed color spaces.

16 bits per pixel bitmaps use rgb16Space, rgba16Space, cmyk16Space, graySpace, or graya16Space.

32 bits per pixel bitmaps may use rgb32Space, rgba32Space, cmyk32Space, or graya32Space.

Hardware devices which have 24 bits of physical memory per pixel can support rgb32Space. Hardware devices which have 32 bits of physical memory per pixel can support rgb32Space, rgba32Space, cmyk32Space, or graya32Space.

C. ColorProfile and Color Matching

All colors in the graphics system are defined in a device-independent way. A color is matched when translated from one color space to another. The color may be matched using colorimetrics, that is, using the algorithmic definition of the color provided by the color space. Or, it may be matched perceptually, so that the color appears to the eye to best match the desired color. [See, co-pending U.S. patent application entitled COLOR MATCHING APPARATUS AND METHOD, referred to above.] The details of color matching according to one embodiment are provided below.

A compound color space is described by a colorProfile, which describes the color characteristics of a color space. A colorProfile provides the data that defines the limitations of a physical device. The colorProfile, in conjunction with the color and color space, precisely define the color and how it is to be converted to other color spaces.

A colorProfile is defined by:

```
typedef struct {
    cieColor red;
    cieColor green;
    cieColor blue;
    cieColor cyan;
    cieColor magenta;
    cieColor yellow;
    cieColor black;
    cieColor white;
    colorResponseCurves *trcData;
    matchFlag flags;
} colorProfile;
```

The red, green, blue, cyan, magenta, yellow, black, and white define the cieSpace coordinates for the primary colorants that define the space.

The trcData specifies the color response curve for each primary. The array indices correspond to red, green, blue, cyan, magenta, yellow, black, and white.

The flags indicate whether the matching occurs using colorimetrics, or by perceptual means. If perceptual match flag is set, whites will always appear as white on the source device, regardless of the white point of the source device.

Algorithmic color spaces rely on a colorProfile to define their colors in a device independent manner. All of the standard algorithmic color spaces, other than those like cieSpace which specify color in a universal way, may use a colorProfile that specifies the primaries according to the SMPTE (Society of Motion Pictures and Television Engineers) recommendations. The SMPTE recommended white points and primary chromaticities specify white, red, green, and blue as:

| | | |
|---|---|---|
| white point (D65) | x(white[0]) = 0.313, | y(white[1]) = 0.392 |
| red | x(red[0]) = 0.670, | y(red[1]) = 0.330 |
| green | x(green[0]) = 0.210, | y(green[1]) = 0.710 |
| blue | x(blue[0]) = 0.140, | y(blue[1]) = 0.080 |

Note that the luminance values (Y values) are not specified. The relative luminances of the primaries and the white points (as well as the remaining cyan, magenta, yellow, and black primaries) may be calculated to match the color's response on, for instance, an Apple 13-inch color monitor, for which the actual colorProfile values used are:

| | | | |
|---|---|---|---|
| red | x = 0.617, | y = 0.339, | Y = 0.212 |
| green | x = 0.151, | y = 0.071, | Y = 0.0116 |
| blue | x = 0.278, | y = 0.602, | Y = 0.672 |
| cyan | x = 0.304, | y = 0.286, | Y = 0.788 |
| magenta | x = 0.279, | y = 0.145, | Y = 0.328 |
| yellow | x = 0.399, | y = 0.508, | Y = 0.884 |
| black | x = 0.279, | y = 0.296, | Y = 0.000 |
| white | x = 0.279, | y = 0.296, | Y = 1.000 |

D. Attributes of an Ink

1. UnderColor Removal

UnderColor removal is an attribute of an ink which specifies the amount of black to remove from the color. It is only appropriate for compound color spaces based on cmykSpace. The default under color removal settings are:

| | | |
|---|---|---|
| undercolor_black = | 0.50 | begin removing the gray component at 50% |
| undercolor_magenta = | 0.0 | remove none of the cyan ink from the magenta ink |
| undercolor_yellow = | 0.0 | remove none of the magenta ink from the yellow ink |
| additive_failure = | 1.0 | no change to computed black component |

E. Converting Color Between Spaces

The color data structure consists of the following:
1) colorspace
2) colorset
3) colorprofile
4) data.

The color space is one of the selected color spaces described above, plus any packing information which indicates the format of the data specifying the components. Also, the color space may be an indexed color.

The colorset is an identifier of the list of colors in the palette of an indexed color space, typically, an unordered list. The colorset value is null for an algorithmic color space.

The colorprofile provides the coordinates of primary colorants within the color space, the tonal reproduction curves, and the matching flags for the specified color space. These values are used in color matching algorithms, as described below [in the above cross-referenced patent application entitled COLOR MATCHING APPARATUS AND METHOD].

Finally, the color data structure includes the data which is packed according to the specific color space or colorset indicated.

The convert to base family algorithm (e.g., module 31 of FIG. 2) is responsive to the colorset and color space parameters to generate a base family color representative of the input color.

If the input colorset is not equal to zero, indicating an indexed color space, then the data and color space for the input color value are replaced with the value looked up in the colorset list in response to the data in the color data structure associated with the index. The colorset value is then set to zero, indicating that the converted color is now in an algorithmic format. Thus, a data structure for an indexed value might read (index, colorset, nil, data) and be converted to a data structure reads (color space, nil, profile, data).

Next, in the convert to base algorithm, if the color space is a packed color space, that is, if it has a data format other than 16 bit values, it is unpacked. Also, the packing identifier on the input color space is corrected in response to the unpacking step. The unpacking in a preferred system is based on simple bit replication techniques. Thus, an 8 bit value is unpacked to a 16 bit value by replicating the 8 bits of the input in both the upper and lower words of the new 16 bit value. A single 10 bit value is unpacked to a 16 bit value by replicating the 10 bits into the upper 10 bits of the 16 bit word, and then the most significant 6 bits of the original 10 bits are replicated into the least significant 6 bits of the 16 bit word. Similarly, a 5 bit data value is unpacked into a 16 bit data value by replicating the 5 bits in each of the three most significant 5 bit sections of the 16 bit word, and the most significant 1 bit of the 5 bit word into the least significant bit. This technique is very fast and yields sufficiently accurate results to maintain the perception of accurate color processing.

The final operation of the convert to base family module determines whether the color space resulting after the index look-up or after the unpack algorithm is a base color space. If not, then a simple conversion based on the published list arithmetic relationships is carried out from the color space to the base color space.

The algorithm for converting from a base family to a destination family (e.g., block 35 of FIG. 2) performs basically the inverse operation of that outlined above. The color processor will deliver a color having a resultant color space and a resultant color data in a base family. If the destination color is not equal to the base family, then a simple convert based on the arithmetic relationship between the base family and the destination family is computed. The profile of the resultant color value is loaded.

If the data for the destination device needs to be packed, then the 16 bit values generated by the color processor are packed using a technique of replicating the most significant bits of the 16 bit values. Thus, a 5 bit packed value is generated from a 16 bit value by copying the most significant 5 bits of the 16 bit word into the 5 bit value.

If the destination space is an indexed space, then the inverse table look-up routines described in the Batson, et al., U.S. Pat. No. 5,068,644, are utilized. This results in finding the closest color in the indexed table to the resultant color from the color processor.

Conversions between base families, or within a base family, to differing profiles (e.g., module 34 of FIG. 2), is carried out as described in the cross-referenced application entitled COLOR MATCHING APPARATUS AND METHOD.

Other techniques for converting could be used. For instance, the following code demonstrates how, given a color in rgbspace, in one alternative example, the corresponding color in cmykSpace (assuming same color profiles) is derived:

c=1.0−r;
m=1.0−g;
y=1.0−b;
k=smallest of (c, m, y);
k=largest of (k−undercolor_black, 0);
c=c−k;
m=m−k−(undercolor_magenta*c);
y=y−k−(undercolor_yellow*m);
k=k*additive_failure.

III. COLOR COMBINING

Module 33 of FIG. 2 performs color combining operations on multiple source input colors. In the preferred system, color combinations are carried out in a recursive transfer mode, where an input color is transferred over a destination color, to generate a new destination color.

Transfer modes specify how the color drawn interacts with the background color. CopyMode causes the color drawn to replace the background color. Copy is the default transfer mode assigned an ink, because it is most common and fastest.

Here's a list of the transfer modes:

```
typedef enum {
    noMode = 0,
    copyMode,
    addMode,
    blendMode,
    migrateMode,
    minMode,
    maxMode,
    highlightMode,
    andMode,
    orMode,
    xorMode,
    rampAndMode,
    rampOrMode,
    rampXorMode,
    overMode,
    atopMode,
    excludeMode,
    fadeMode
} transferTypes;
```

The first group of modes past copyMode, addMode through xorMode, use the source color, the destination color, and sometimes an operand value to calculate the new destination color. The second group additionally uses the alpha component of the color spaces rgbaSpace, rgba32Space or rgba16Space to determine the transparency of the source and destination colors.

The following Table illustrates the transfer modes functions for the first group identified above.

A. Standard Transfer Modes copyMode
    The source component replaces the destination component.
addMode
    The source component is added to the destination component, but does not allow the result to exceed some maximum.
blendMode
    The destination component is replaced by the average of the source component and destination component, using the operand component to specify the ratio.
migrateMode
    The destination component is moved toward the source component by the step specified in the operand component.
minMode
    The source component replaces the destination component if the source component has a smaller value.
maxMode
    The source component replaces the destination component if the source component has a larger value.
highlightMode
    The operand specifies a color component or components, which are swapped with the source component or components in the destination. This mode is reversible.
andMode
    The and operation is performed with the source component value on the destination component value.

orMode

The or operation is performed with the source component value on the destination component value.

xorMode

The xor operation is performed with the source component value on the destination component value. (In any bit-depth other than 1, this yields unpredictable results.)

rampAndMode

The source and destination color components are treated as ranging from 0 to 1; their product (source*dest) is returned.

rampOrMode

The source and destination color components are treated as ranging from 0 to 1; source+dest-source*dest is returned.

rampXorMode

The source and destination color components are treated as ranging from 0 to 1; source+dest-2*source*dest is returned.

B. Alpha Channel Transfer Modes

The color spaces rgbaSpace, rgba32Space and rgba16space have an alpha channel. This is a fourth color component used to represent opacity or transparency. When converting a color from a non-alpha color space to an alpha color space, the alpha channel is set to maximum (opaque). When converting a color from an alpha color space to a non-alpha color space, the alpha channel is lost.

The transfer modes involving the alpha channel have a slightly different behavior than the other transfer modes; the fourth color component is assumed to represent opacity. Further, the transfer modes apply different operations to the alpha channel than to other components.

Given the source and destination bit images below, the alpha channel transfer modes will produce the results listed below.

overMode

The source color component A is placed over the destination component B. The transparency of the source allows the destination to show through. The component c and alpha a are operated on as follows.

$\alpha := \alpha A + \alpha B - \alpha A \alpha B$ $c := (\alpha A (cA - \alpha BcB) + \alpha BcB)/(\alpha A + \alpha B - \alpha A \alpha B)$ atopMode The source component A is placed over the destination component B. The new destination retains the original destination's transparency. The alpha component is not changed.

$a := \alpha B$ $c := cB + \alpha A (cA - cB)$ excludeMode

The destination component B remains visible only where the source component A is transparent, and the source is copied anywhere the destination is transparent. The alpha component is operated on by the namp XOR mode.

$a := \alpha A + \alpha B - 2\alpha A \alpha B$ $c := (\alpha AcA + \alpha BcB - \alpha a \alpha B (cA + cB))/(\alpha A + \alpha B - 2\alpha A \alpha B)$ fadeMode The source component A is blended with the destination component B, using the relative alpha-values as the ratio for the blend.

$\alpha := \alpha A + \alpha B$ (pinned to 1)

$c := (\alpha AcA + \alpha BcB/(\alpha A + \alpha B)$ (pinned)

inMode

This mode supplies the source color component A with the alpha component of the source multiplied by the alpha component of the destination component B.

$\alpha := \alpha A \alpha B$ $c := cA$ outMode

This mode supplies the source color component A with the alpha component of the source component A multiplied by one minus the alpha component of the destination component B.

$\alpha := \alpha A - \alpha A \alpha B$ $c := cA$

A standard library function is used to develop per component transfer mode records for the alpha channel transfer modes.

C. Transfer Mode Record

The transfer mode record is defined by up to four transfer component structures, one per component in the color space:

```
typedef struct {
        unsigned char       componentMode;
        unsigned char       componentFlags;
        unsigned short      sourceMin;
        unsigned short      sourceMax;
        unsigned short      deviceMin;
        unsigned short      clampMin;
        unsigned short      clampMax;
        unsigned short      operand;
}transferComponent;
```

Component mode is one of the transfer modes discussed above. For the examples shown, all of the color components contain the same mode, except for alpha modes.

The fields sourceMin, deviceMin, deviceMax, clampMin, and clampMax all specify a range of the color space as parameters to applying a transfer mode. The minimum and maximum ranges are interpreted as shown in FIG. 11.

Figure 11:
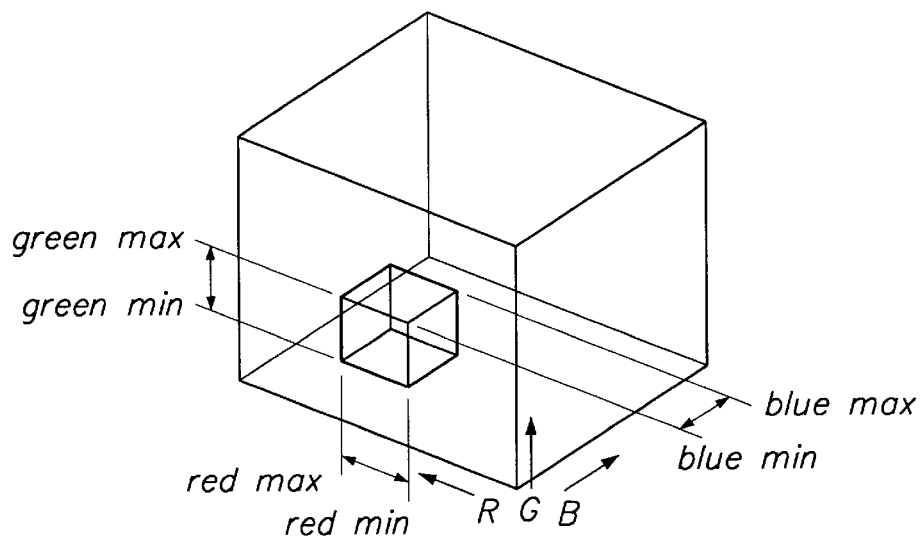
FIG. 11 illustrates the min and max range values for RGB space.

In FIG. 11, the large cube represents all of RGB space. The small cube represents the ranges of min and max for all three components.

Figure 12A:
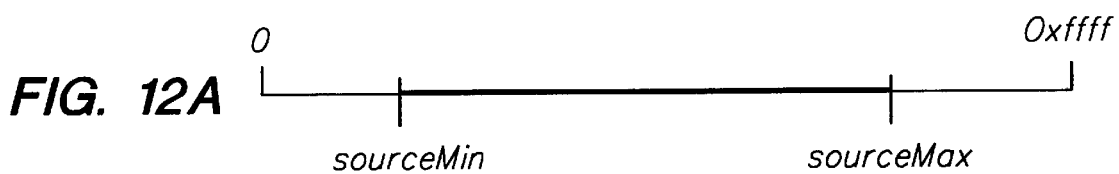
FIGS. 12A and 12B illustrate the sourceMin and sourceMax functions.
Figure 12B:

SourceMin and sourceMax specify the range allowed for the source component as illustrated in FIG. 12A. Components outside of the range cause no drawing to occur (abort color operation). If sourceMax is less than sourceMin, as shown in FIG. 12B, the range allowed is less than sourceMax or greater than sourceMin.

DeviceMin and deviceMax specify the range for the destination component in the same way. Colors outside of the range are unaffected.

Figure 13A:
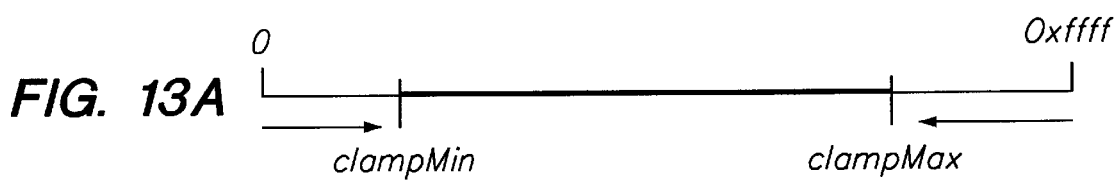
FIGS. 13A and 13B illustrate the clampMin and clampMax functions for the resultant data.
Figure 13B:
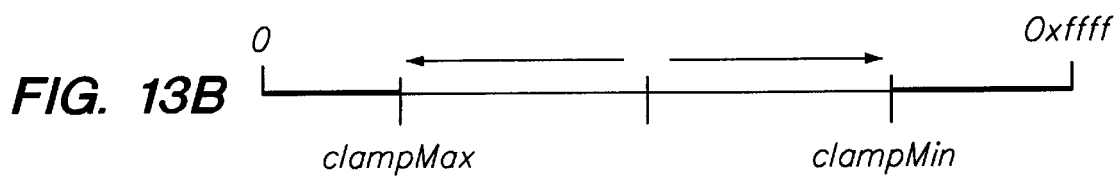

ClampMin and clampMax specify the range allowed the computed component; if the component is outside the range, it is pinned to the minimum or maximum value, as indicated by arrows in FIG. 13A. If clampMin is greater than clampMax, then the computed component is set to less than or equal to clampMax, or greater than or equal to clampMin, as shown in FIG. 13B.

Clamping restricts the value of the computation, not the value allowed for the actual pixel for indexed spaces. The pixel value is the closest in the list found to the computation, which may be outside of the clamp range.

Operand is used by blendMode to specify the ratio of source and destination component. With migrateMode, it specifies the step size by which the source component moves toward the destination component.

Up to four transferComponents are gathered into a transferMode data structure as shown below, along with the transferMode color space, filters, and flags:

```
typedef struct{
        colorSpace          space;
        colorMatrix         sourceFilter;
        colorMatrix         deviceFilter;
        colorMatrix         resultFilter;
        char                modeFlags;
        transferComponent component [4];
}transferMode;
```

Space specifies the working color space the transfer mode takes place in. This space does not need to be the source or destination color space. It does define how many components are required to define the transferMode. Monochromatic (gray) spaces require only one component to be filled out. Alpha spaces and cmykSpace require four components to be filled out. All other spaces require three spaces to be filled out.

Choosing a different space can radically affect the behavior of a transfer mode.

Computations for source, device, and clamp limiting are done in the transferMode color space.

SourceMatrix, deviceMatrix, and resultMatrix provide a way of swapping, scaling, averaging, and adding offsets to the components before or after the transferMode computation. Each filter is a 4 by 5 matrix that specifies the mixture scale factor of each of the components and an offset.

An identity matrix has no affect:

$$[c\ m\ y\ k\ 1] \begin{bmatrix} 1.0 & 0.0 & 0.0 & 0.0 \\ 0.0 & 1.0 & 0.0 & 0.0 \\ 0.0 & 0.0 & 1.0 & 0.0 \\ 0.0 & 0.0 & 0.0 & 1.0 \\ 0.0 & 0.0 & 0.0 & 0.0 \end{bmatrix} = [c\ m\ y\ k]$$

This matrix replaces c and k as shown.

$$[cmyk1] \begin{bmatrix} 0.5 & 0.0 & 0.0 & 0.0 \\ 0.5 & 1.0 & 0.0 & 0.0 \\ 0.0 & 0.0 & 1.0 & 0.0 \\ 0.0 & 0.0 & 0.0 & 0.8 \\ 0.0 & 0.0 & 0.0 & 0.2 \end{bmatrix} = [(c^*.5 + m^*.5)\ m\ y\ (k^*.8 + .2)]$$

The source and device matrix (when the device color is the second input color) are applied before transfer mode calculation, the result of the calculation is then run through a result filter.

ModeFlags negate the result of sourceMin and sourceMax, or deviceMin, and deviceMax. With no flags set, the result is unchanged if any one of the components are outside of the allowed range; with the flags set, the result is unchanged only if all of the components are inside of the allowed range.

The values for modeFlags are:

```
typedef enum {
        rejectSourceRange = 1,
        rejectDeviceRange = 2,
        singleTransferComponent = 4
} transferModeFlags;
```

Although color components are described by unsigned shorts, 16 bit positive number, the math internal to transferModes are performed with longs, 32 bit signed numbers. Thus, the sourceMatrix could multiply by 3 and the result matrix could divide by 3 without creating an overflow condition.

Figure 14:
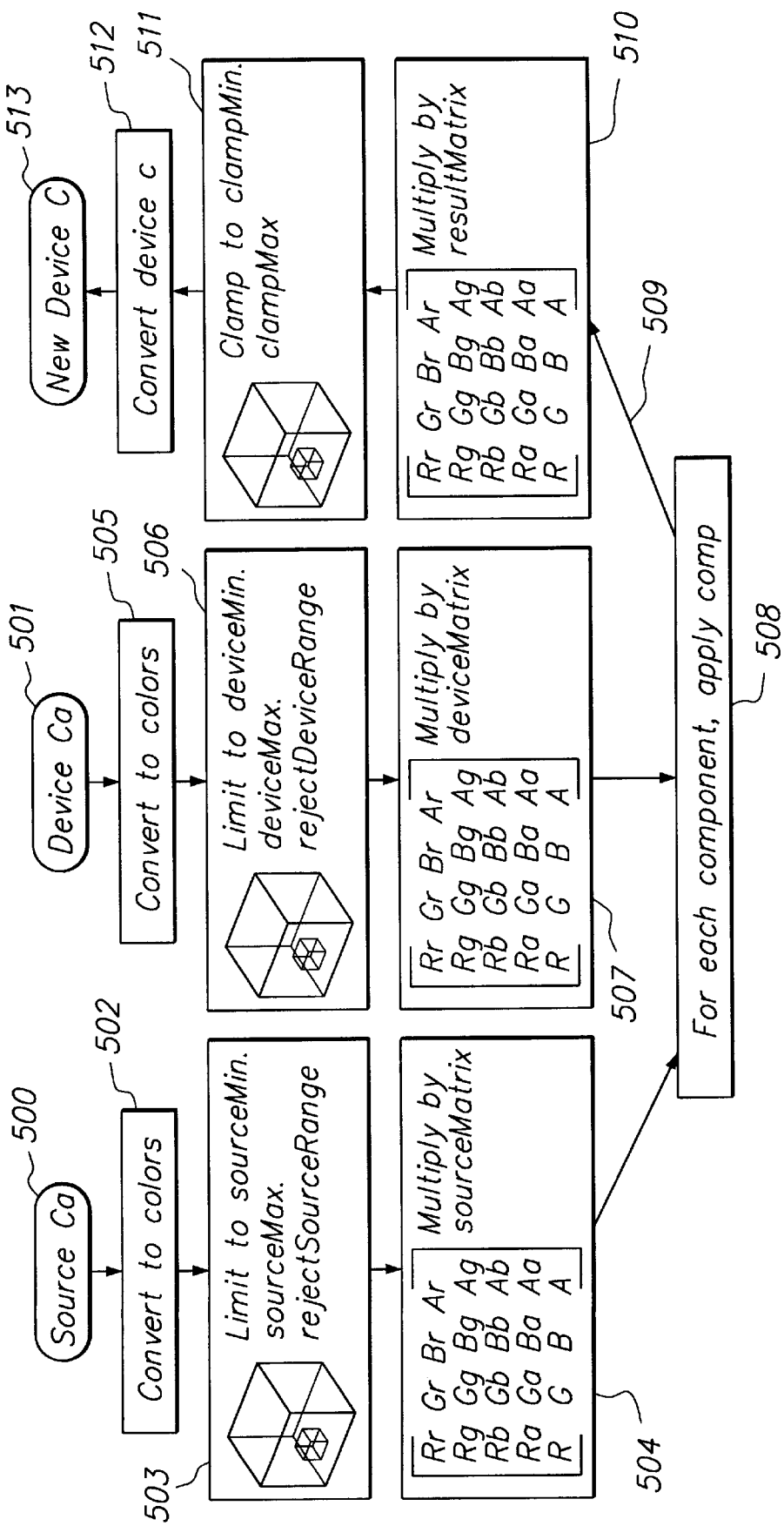
FIG. 14 is a functional diagram of a color combining system according to the present invention.

FIG. 14 illustrates the transfer mode architecture of the preferred system. The inputs to the transfer mode architecture include the source color 500, the device color 501, and the transfer mode data structure, which is described above. The source color 500 is converted to the color space of the transfer mode in block 502. Next, the working color data from block 502 is passed through the condition checking module 503 based on the sourceMin, sourceMax, and rejectSource range parameters of the transfer mode. The after condition testing, the working data is supplied to the source filter block 504 in which it is multiplied by the source matrix.

Similarly, the device color 501 is supplied to the convert block 505 in which it is converted to the working color space. The working color data is then supplied to the condition checking module 506, which tests the working device color in response to the deviceMin, deviceMax, and rejectDevice range parameters. The working data is then passed from block 506 to the filter block 507, in which it is multiplied by the device matrix.

The filtered data is supplied from the filter 504 and the filter 507 to an arithmetic/logic unit 508 which applies the computation(s) specified by the transfer mode operator(s). The output of the arithmetic/logic unit 508 is supplied as intermediate data on line 509. The intermediate color data is multiplied by the result matrix in the filter 510. The output of the filter 510 is supplied to condition checking logic 511, which applies the clampMin and clampMax parameters from the transfer mode data structure. The output of the condition checking logic 511 is supplied to a convert module 512 which converts the resultant color from the working color space to the device color space. The output of the convert module 512 is the new device color 513.

This structure can be generalized such that the input colors 500 and 501 come from arbitrary sources.

IV. COLOR MATCHING

FIGS. 15–21 illustrate the basic overview of a color matching system which may be used with the present invention, the calibrated color spaces and tonal reproduction curves, and how gamuts of various color graphic devices may not match.

FIGS. 22–34 illustrate preferred implementations of the color translation system.

Figure 15:
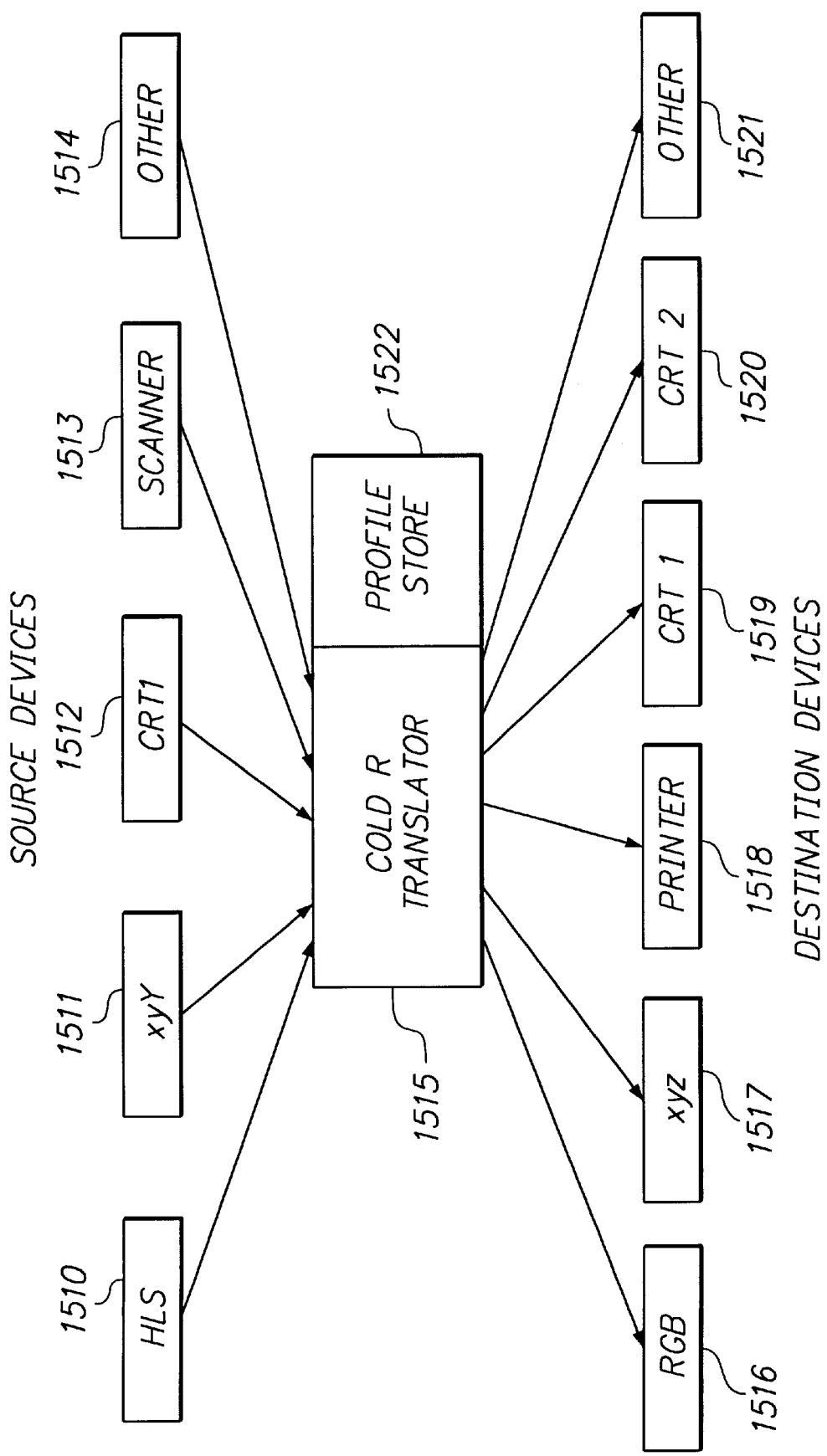
FIG. 15 is a heuristic block diagram of the color translation system of the present invention.

FIG. 15 shows a heuristic diagram of the color matching system. The system includes a plurality of source devices 1510, 1511, 1512, 1513, 1514. The source devices include virtual devices, such as color composition routines, in which colors are manipulated in a color space such as the virtual device 1510 using color space HLS, and virtual device 1511 using color space xyY. Also, the source devices include real devices such as a cathode ray tube CRT1 1512 and a scanner 1513. Other real or virtual devices 1514 could be included in the system.

The system also includes a plurality of destination devices 1516, 1517, 1518, 1519, 1520, 1521. The destination devices display or store colors in respective color spaces. Also, the destination devices may include virtual devices such as the device 1516 and the device 1517 which represent colors in the color spaces RGB and XYZ, respectively. The destination devices also include real devices such as printer 1518, a CRT1 1519, a CRT2 1520, and other real and virtual devices 1521.

Note that the CRT1 1512 of the source devices and the CRT1 1519 of the destination devices illustrate heuristically that a single device, either real or virtual, may act as both a source device and as a destination device in the matching system of the present invention.

Coupled between the source devices 1510, 1511, 1512, 1513, 1514, and the destination devices 1516, 1517, 1518, 1519, 1520, and 1521, is a color translator 1515. The color translator includes a profile store 1522 which stores the profiles of the source devices and the destination devices used in the matching algorithm. Profiles include independently derived specifications of colorants produced by the color graphics devices in the system, and of any anomalies in the real devices as represented by tonal reproduction curves. A description of the profiles is provided in more detail below.

Figure 16:
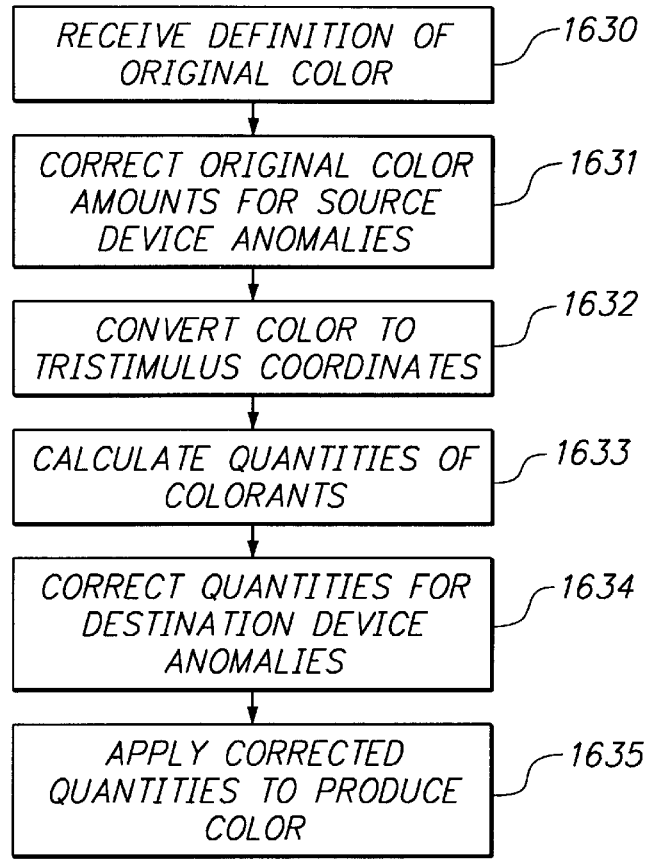
FIG. 16 is an overview flowchart of the translation algorithm.

FIG. 16 is an overview flow chart for operation of the color matching system shown in FIG. 15. In the first step 1630, the translator 1515 receives a signal defining of the original color from a source device. This definition typically takes the form of a specification of colorant amounts in the color space of the source device. Thus, for virtual device 1510, the specification will consist of the HLS coordinates of the color. For source device 1512, the definition may include the weights given to the red, green, and blue phosphors for a given pixel on the CRT. In the next step, represented by block 1631, the color translator 1515 corrects the original color amounts for source device anomalies in response to the tonal reproduction curves in the profile store 1522.

After correction in block 1631, the translator 1515 converts the color to tristimulus coordinates, or to coordinates in another calibrated color space (block 1632).

In response to the independent profiles of the source and destination devices, the translator then calculates the quantities of colorants needed in the destination device to reproduce the color of the source device (block 1633). Next, an inverse tonal reproduction curve is accessed from the profile store 1522 to correct the calculated quantities for destination device anomalies (block 1634). Finally, the corrected quantities are applied to the destination device to produce the color (block 1635).

Figure 17:
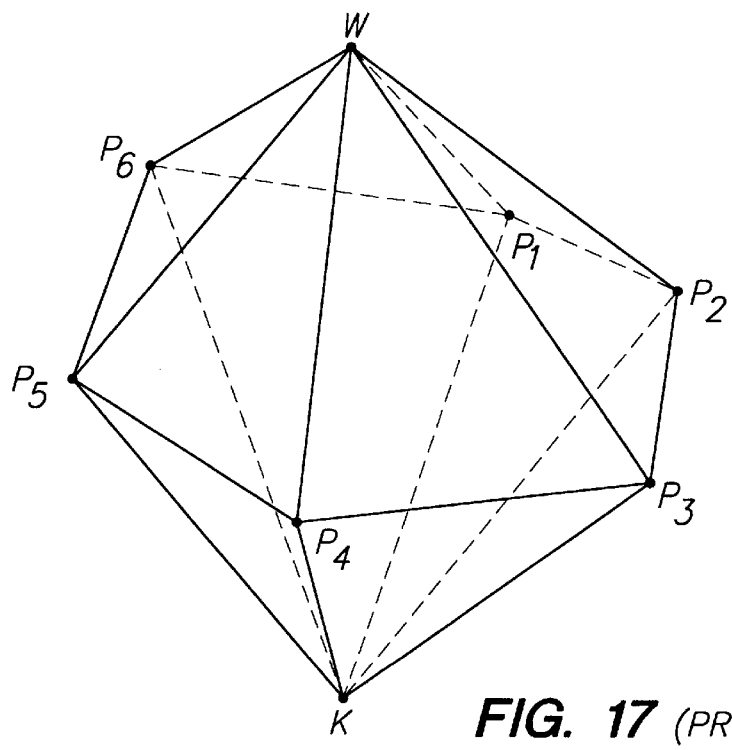
FIG. 17 is a graph illustrating a representative color gamut in a calibrated color space.

FIGS. 17–21 illustrate the characteristics of the profile stored in a preferred embodiment of the present invention. In FIG. 17, a color gamut in the CIE tristimulus coordinate system (XYZ) is illustrated. The color gamut is represented in the profile according to the present invention by the measured tristimulus coordinates of each of the colorants produced in the destination device. Thus, the gamut of FIG. 17 is totally represented by the XYZ coordinates of each of the chromatic colorants $P_1$–$P_6$, and in addition, the XYZ coordinates of the achromatic colorants white W and black K. The volume of the shape shown in FIG. 17 which is defined by these 8 points represents the gamut of colors that can be produced or displayed on a respective source or destination device.

It is noted that the gamut of FIG. 17 includes six chromatic colorants while a CRT and printer typically include only three chromatic color sources (e.g., red, green, blue, or cyan, magenta, yellow). The balance of the colorants in the gamut of FIG. 17 are determined by mixtures of the three primary color sources of the device. The gamut using six chromatic colorants to represent the color space provides a more accurate representation of the colors that are producible by mixing the primary colorants. Of course, the larger number of points used to represent the gamut, the greater accuracy in color matching can be achieved. It is found, however, that six chromatic colorants plus white and black provide a satisfactory profile of the source or destination devices for most applications.

Figure 18:
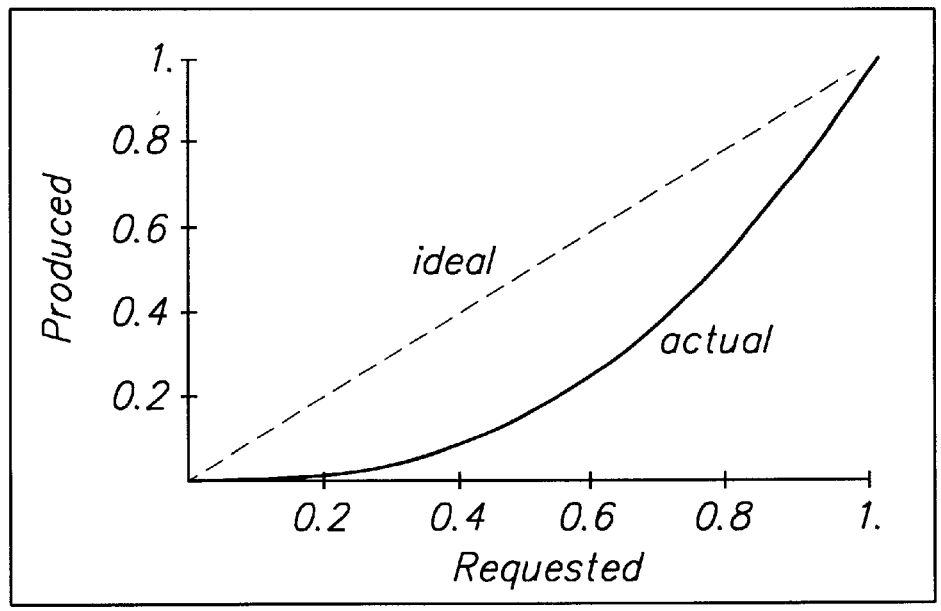
FIG. 18 is a tonal reproduction curve for a typical CRT monitor.
Figure 19:
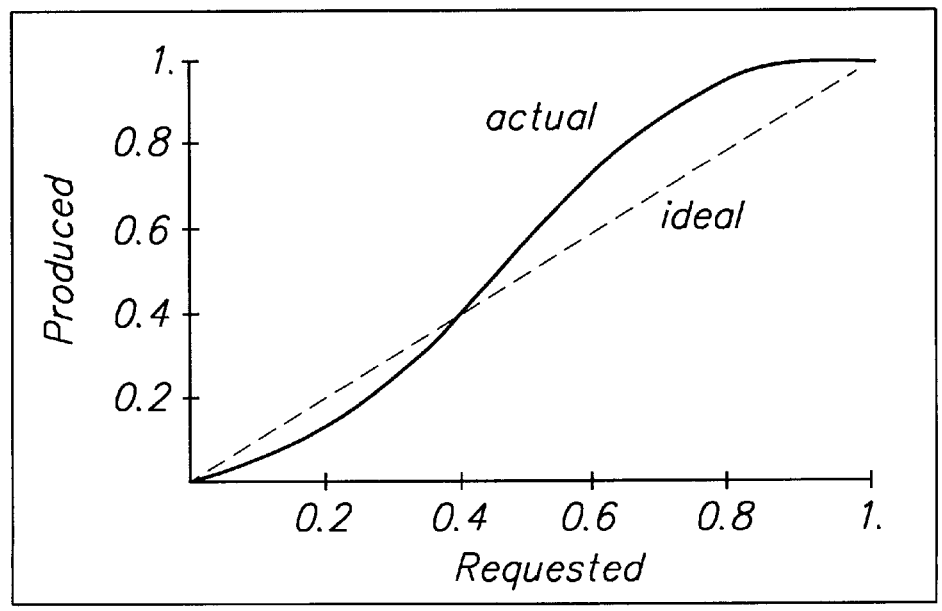
FIG. 19 is a tonal reproduction curve for a typical printer.

FIGS. 18 and 19 provide typical TRC curves. FIG. 18 is a TRC for one colorant, e.g., red, for a typical CRT monitor. The profile will include a TRC for each primary colorant of each real source and destination device. FIG. 19 represents a TRC for a typical printer ink. The TRCs are measured tables with a finite number of samples. Interpolation is used to complete the range of the TRC during use.

A graph of requested versus actual amounts produced for an output process is known as a tonal reproduction curve (TRC). A TRC can be determined by producing a series of samples, for i=1 (x%) through a selected number N (x%) of samples, where N times x%=100%, of increasing colorant amounts on the device for each colorant, measuring the tristimulus or chromaticity coordinates ($X_i$, $Y_i$, $Z_i$) for each amount i, then calculating the actual color amount $a_i$ produced for each sample i from $$a_i = \frac{Q_W - Q_i}{Q_W - Q_P}$$

where Q is the coordinate selected from the tristimulus coordinates X, Y, or Z, such that $Q=\max(\Delta X, \Delta Y, \Delta Z)$ and $\Delta X = X_W - X_P$ $\Delta Y = Y_W - Y_P$ $\Delta Z = Z_W - Z_P$ The quantities $X_P$, $Y_P$, $Z_P$ are the tristimulus values for the pure colorant, and $X_W$, $Y_W$, $Z_W$ are the tristimulus values for white of the device.

That is the coordinate Q is the tristimulus coordinate (X, Y, or Z) for the colorant with the maximum amount of change across the series.

For example, if the X coordinate for red exhibited the maximum change, then the X coordinates for white $X_W$, the colorant $X_P$, and the sample $X_i$ would be substituted into the above equation to determine the TRC for the red colorant.

The TRC becomes a plot or table of the requested amount i times x% versus the actual color a; produced for each colorant for a subject device and is independent of the source or destination devices with which the subject device is to be used.

Since there are usually variations in the production and measuring systems, a curve may be fitted to the data and the fitted data used for the final colorant amounts. For example, 10 samples for each colorant may be measured, and interpolation is used to adjust for intermediate values.

Figure 20:
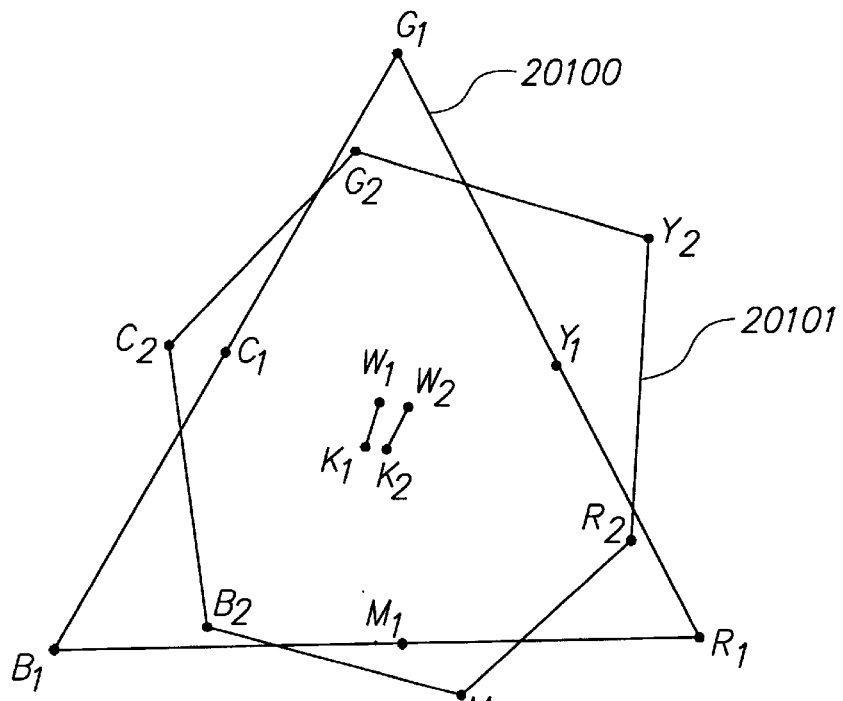
FIG. 20 is a graph illustrating variant color profiles of two color graphic devices.

FIG. 20 illustrates color gamuts of two devices in a manner which emphasizes the differences in the color gamuts. Thus, the illustration in FIG. 20 can be considered a graph in the xyY CIE chromaticity space of a CRT monitor represented by essentially a triangular shaped gamut 20100 and of a printer represented by a six sided polygon 20101. The CRT monitor includes three primary colorants, red $R_1$, blue $B_1$, and green $G_1$. Three additional chromatic colorants, yellow $Y_1$, magenta $M_1$, and cyan $C_1$, are plotted along the boundary of the triangular shaped region 20100. The white $W_1$ and black $K_1$ are illustrated near the center of the triangular region 20100 with a gray line extending between the white and black points. Similarly, the printer gamut 20101 includes three primary colorants, yellow $Y_2$, magenta $M_2$, and cyan $C_2$. Three additional colorants, red $R_2$, blue $B_2$, and green $G_2$ are produced by mixing the primary chromatic colorants. The white and black points, $W_2$ and $K_2$, are similarly illustrated near the center of the region.

FIG. 20 illustrates several characteristics of the profiles of color graphic devices. First, the gamuts do not match. Thus, a color in the CRT monitor space 20100 may not map directly into a color in the printer space 20101. Such colors are referred to as out-of-gamut colors. Also, the achromatic colors, white and black, do not match in the respective color graphic devices.

Figure 21:
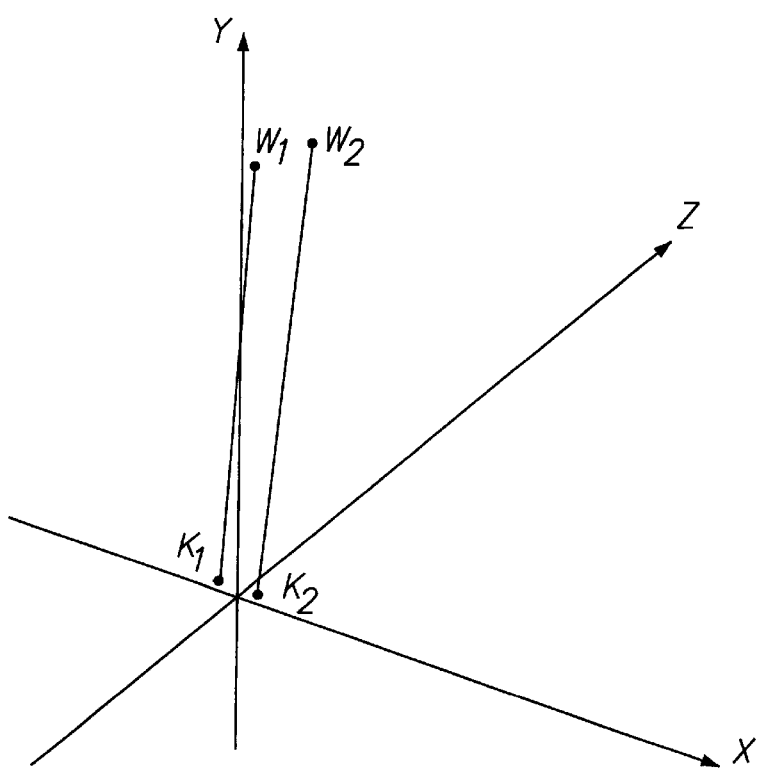
FIG. 21 is a graph illustrating misalignment of the gray axes of the color gamuts in two color graphic devices.

FIG. 21 is a graph shown to illustrate the differences between the gray axes in two devices. For instance, the gamut 20100 of the CRT monitor in FIG. 20 includes white point $W_1$ and black point $K_1$ which is illustrated in FIG. 21 in the XYZ tristimulus space. Similarly, the gamut 20101 of FIG. 20 includes white point $W_2$ and black point $K_2$. The length of the axis called the gray axis from $W_1$ to $K_1$ does not match the length of the axis from $W_2$ to $K_2$. Also, the respective axes are not parallel.

Therefore, the color profiles stored in the profile store 1522 of the matching system shown in FIG. 15 include the coordinates of the colorants in the respective source and destination color graphics devices. The matching algorithm takes into account the device anomalies as represented by the TRCs in the profile store for the respective source and destination devices. These profiles provide the matching algorithm with enough information to specify the differences between the profiles as illustrated in FIGS. 20 and 21 which allow for fast, accurate, and flexible color matching to be performed.

Figure 35:
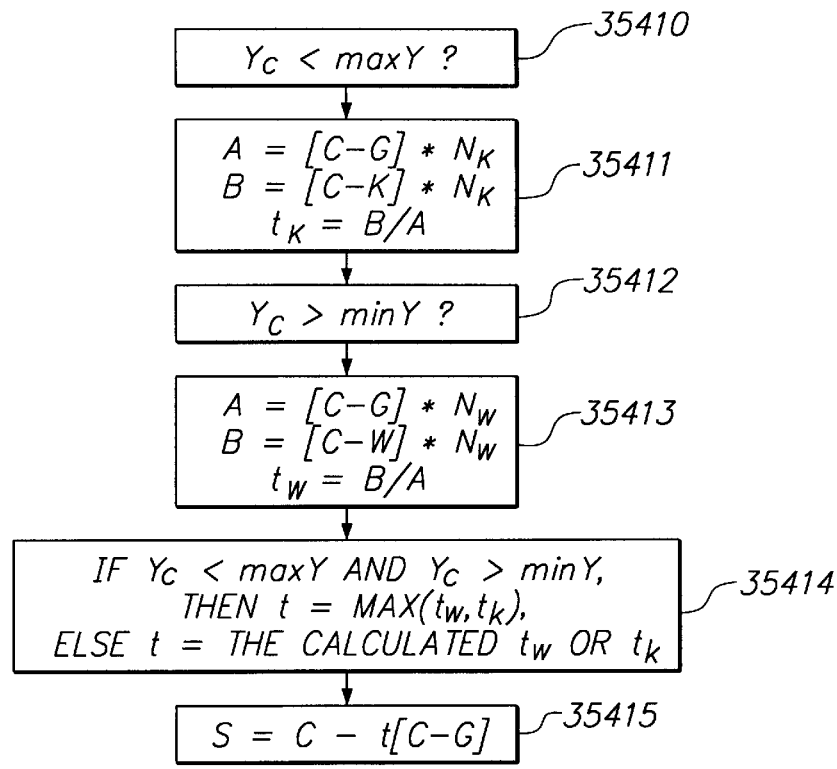
FIG. 35 is a flowchart of a routine for calculating an out-of-gamut projection according to the present invention.
Figure 36:
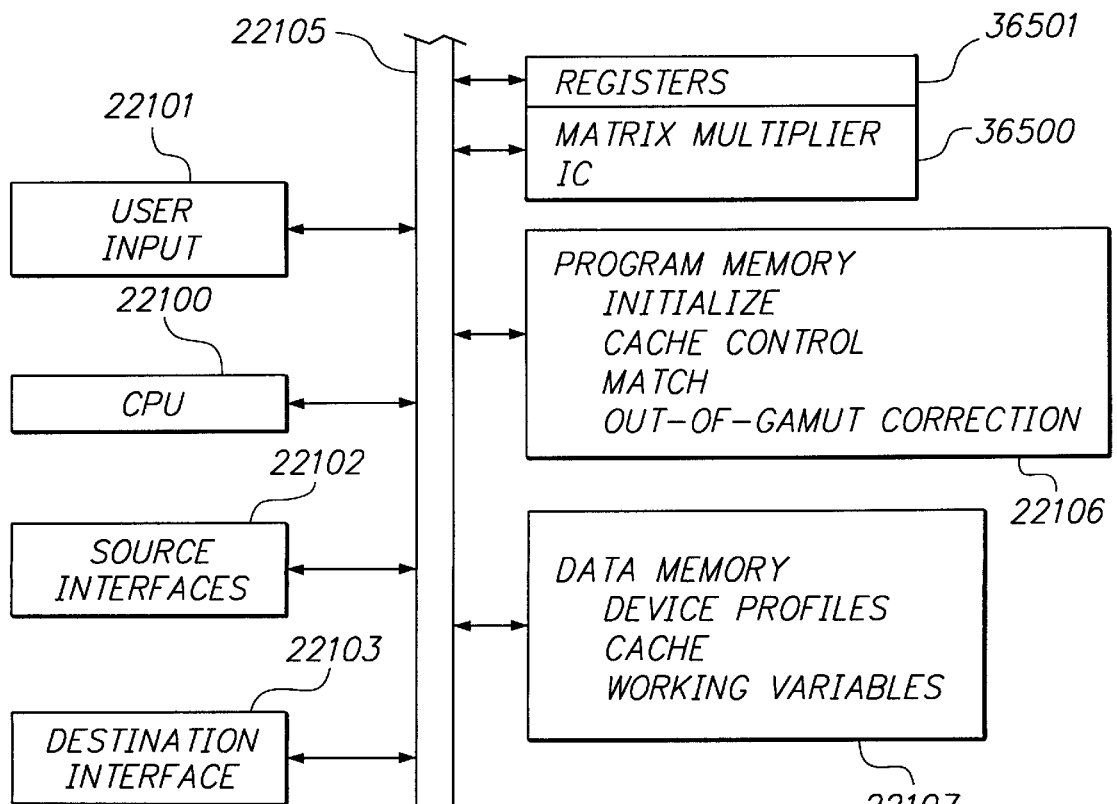
FIG. 36 is a schematic diagram of an alternative color translator system according to the present invention.

FIGS. 22–35 illustrate an implementation of a preferred embodiment of the color translator and profile store 1522 of FIG. 15. FIG. 36 provides a schematic diagram of an alternative color translator and profile store which utilizes an integrated circuit matrix multiplier to enhance the speed of operations.

Figure 22:
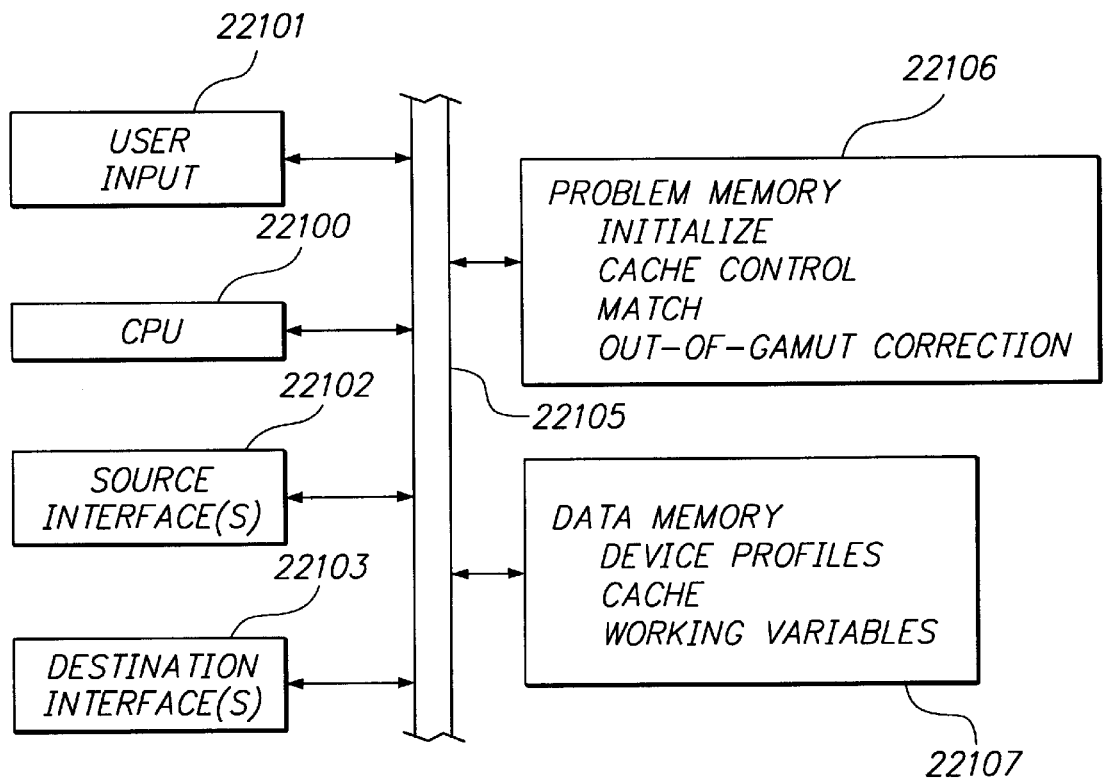
FIG. 22 is a schematic block diagram of a computer system implementing the color translation algorithm of the present invention.

FIG. 22 illustrates one preferred embodiment of the color translator of the present invention. In this preferred embodiment, the color translator comprises a computer system including a central processing unit 22100, a user input device 22101, such as a keyboard, a source color graphics device interface or interfaces, 22102, and a destination color graphics device interface or interfaces, 22103. The interfaces 22102, 22103 are in turn coupled to real color graphics devices, such as scanners, printers, or display systems. The components of the computer system communicate across bus 22105. Coupled to bus 22105 are a program memory 22106 and a data memory 22107. The program memory includes an initialize routine, a cache control routine, a match routine, and an out-of-gamut correction routine. The data memory stores the device profiles, provides space for the cache, and provides space for working variables.

Figure 23:
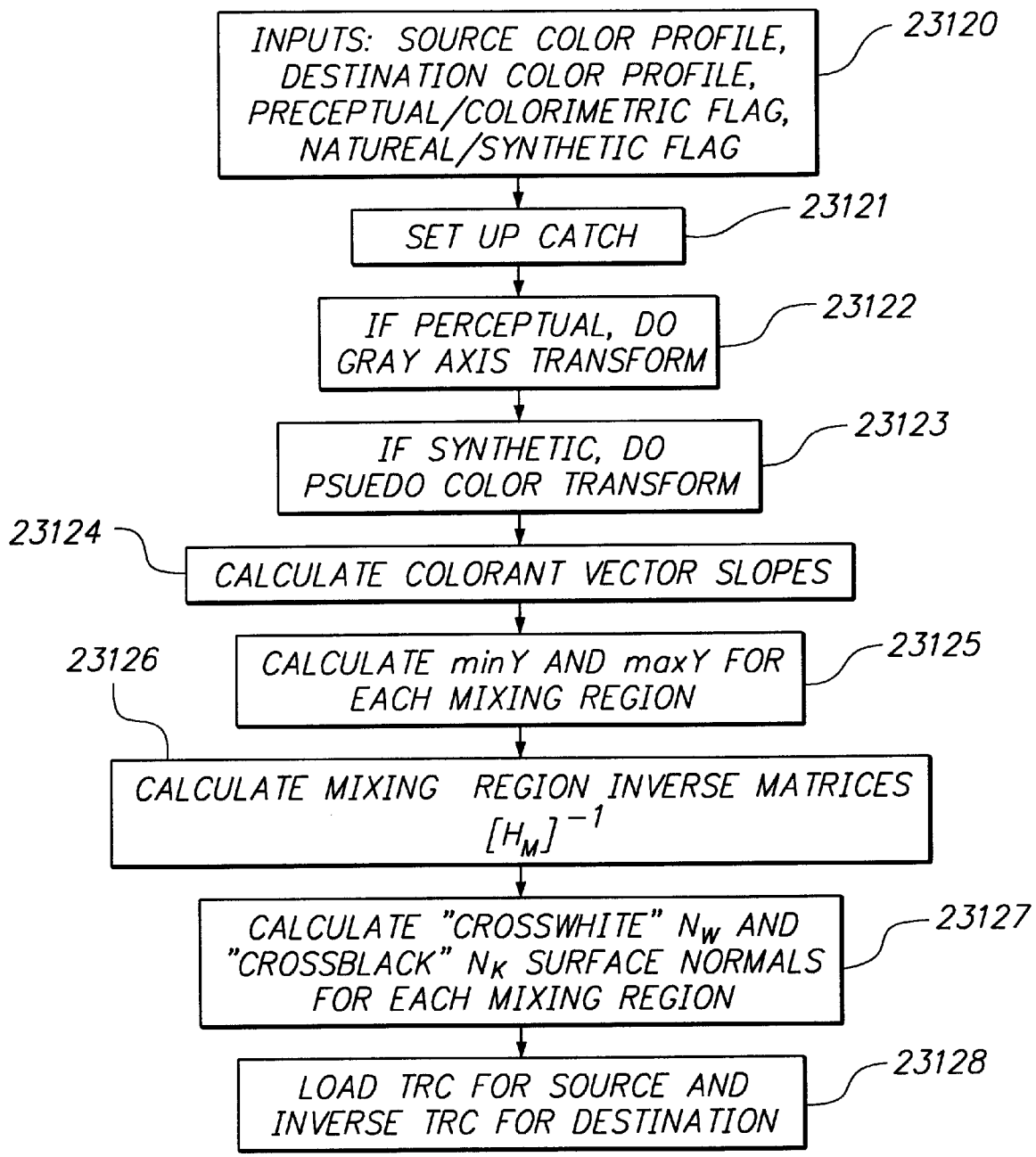
FIG. 23 is a schematic flowchart of an initialization routine used according to the present invention.

The initialize routine is demonstrated in FIG. 23. According to this embodiment of the present invention, the inputs to the initialize routine include independently derived color profiles of color graphics devices. Also, the inputs may include flags used to select selectable features of the translator system (block 23120). The flags in this embodiment include a perceptual/colorimetric flag, and a natural/synthetic flag. These flags are used to select options for handling the differences between the source and destination gamuts and for handling techniques for adjusting an out-of-gamut color.

A first step in the initialize routine is to set up a cache for the color translation system (block 23121). The cache is particularly useful in systems which will perform a large number of color translations, such as when translating an image including hundreds of thousands or millions of pixels. An implementation of a cache is illustrated with respect to FIG. 24.

After the cache is set up in block 23121, the initialize routine performs some calculations on the source and destination profiles in order to set up matching equations and other parameters used in the matching algorithm. As shown in FIG. 23, a first step is to test the perceptual/colorimetric flag. If perceptual flag is set, then a gray axis transform is done which results in deformation of the destination gamut such that achromatic points of the source device gray axis (see FIG. 21) are mapped to corresponding achromatic points in the destination device gray axis (block 23122). If the flag is set to generate "calorimetric" results, no gamut transform is done in this step. The gray axis transform results in movement of the axis such that the black points $K_1$ and $K_2$ coincide, and rotation of the axis and proportional scaling of the axis so that the white points $W_1$ and $W_2$ coincide. Details of the gray axis transform are discussed below. This gray axis adjustment is found to result in color matches which are perceived by the observer as matching achromatic colors due to the color constancy effect of the human visual system. Without this gray axis correction, a color on the achromatic axis of a source device may appear to actually include a chromatic colorant when translated to the destination device.

The gray axis transform is accomplished by rotating the destination gamut in the XYZ space so that the gray axis of the destination between points $W_2$ and $K_2$ is aligned with the gray axis of the source between points $W_1$ and $K_1$. Also, rotation is carried out in the plane containing the two gray axes. This rotation may be carried out according to the following equations:

Point P on destination gray axis rotated to $P_1$ on source gray axis.

$$P_1 = K_1 + M(P - K_2)$$

where M is defined as follows:

$$A = W_1 - K_1; \text{ and } a = \frac{A}{\|A\|}$$

$$B = W_2 - K_2; \text{ and } b = \frac{B}{\|B\|}$$

$$M \begin{bmatrix} b \\ a \times b \\ b \times (a \times b) \end{bmatrix} = \begin{bmatrix} \frac{A}{\|B\|} \\ a \times b \\ a \times (a \times b) \end{bmatrix}$$

solving for M:

$$M = \begin{bmatrix} b \\ a \times b \\ b \times (a \times b) \end{bmatrix}^{-1} \begin{bmatrix} \frac{A}{\|B\|} \\ a \times b \\ a \times (a \times b) \end{bmatrix}$$

Because the inverted matrix is orthogonal, the transpose may be substituted as follows:

$$M = \begin{bmatrix} b \\ a \times b \\ b \times (a \times b) \end{bmatrix}^T \begin{bmatrix} \frac{A}{\|B\|} \\ a \times b \\ a \times (a \times b) \end{bmatrix}$$

Another method of luminance correction (gray axis) is to reference the colorants to the white during gamut measurement and generation of the TRC's. The exact method depends upon the type of calibration equipment used and the reference methods provided by the manufacturer. For spectrophotometers, the spectrum of each colorant is divided by the spectrum of the white, then the chromaticity coordinates are calculated from the resulting spectrum. This will produce a white with 100 as the Y value and each primary scaled appropriately to the range 0–100.

For a calorimeter, a reading of the white is used for the calibration white. Again, a Y value of 100 should be the result with the other primaries scaled proportionately.

This method of applying the luminance correction during calibration may be a better method for matching systems with the preferred acquisition mode being spectrophotometric measurement.

Next, the natural/synthetic flag is tested (block 23123). If natural, then no transform is done. If the synthetic flag is set, the user desires results which preserve saturation and hue. In this case, a pseudo color transform is done as described below with respect to FIGS. 24A and 24B.

Next in the initialize routine, vector slopes are calculated for each of the chromatic colorants (actual and pseudo colorants) in the destination device, from a point on the achromatic axis to the point in the profile representing the colorant (block 23124). These values are stored for use in the matching routine. These vectors delimit color mixing regions within the destination device color gamut in which a color can be generated by mixing only two chromatic colorants with the achromatic colorants of the device.

Next in the initialize routine, maxY and minY parameters are determined for each mixing region (block 23125). These parameters indicate the highest and lowest Y positions, respectively, in the tristimulus space of the two chromatic colorants used for each mixing region. These values again are used in the matching routine as described below.

For each color mixing region, the amount of colorants necessary to produce a given color $C=(X_C, Y_C, Z_C)$ can be calculated according to the following matrix equations:

The color mixing equations for each mixing region reduce to:

$$X_C = a_{P1}X_{P1} + a_{P2}X_{P2} + a_W X_W + a_K X_K$$

$$Y_C = a_{P1}Y_{P1} + a_{P2}Y_{P2} + a_W X_W + a_K Y_K$$

$$Z_C = a_{P1}Z_{P1} + a_{P2}Z_{P2} + a_W X_W + a_K Z_K$$

$$1 = a_{P1} + a_{P2} + a_W + a_K$$

where $a_{P1}$ and $a_{P2}$ represent the fractional amounts of the two chromatic colorants for a mixing region, and $a_W$ and $a_K$ represent the fractional amount of the white and black colorants.

Substituting $1 - a_{P1} - a_{P2} - a_W$ for $a_K$:

$$X_C = a_{P1}X_{P1} + a_{P2}X_{P2} + a_W X_W + (1 - a_{P1} - a_{P2} - a_W) X_K$$

$$Y_C = a_{P1}Y_{P1} + a_{P2}Y_{P2} + a_W Y_W + (1 - a_{P1} - a_{P2} - a_W) Y_K$$

$$Z_C = a_{P1}Z_{P1} + a_{P2}Z_{P2} + a_W Z_W + (1 - a_{P1} - a_{P2} - a_W) Z_K$$

where $0 \leq a_{P1}, a_{P2}, a_W, a_K < 1$

Rearranging the terms produces $$X_C - X_K = a_{P1}(X_{P1} - X_K) + a_{P2}(X_{P2} - X_K) + a_W(Y_W - Y_K)$$

$$Y_C - Y_K = a_{P1}(Y_{P1} - Y_K) + a_{P2}(Y_{P2} - Y_K) + a_W(Y_W - Y_K)$$

$$Z_C - Z_K = a_{P1}(Z_{P1} - Z_K) + a_{P2}(Z_{P2} - Z_K) + a_W(Z_W - Z_K)$$

Representing in matrix form $$\begin{bmatrix} X_C - X_K \\ Y_C - Y_K \\ Z_C - Z_K \end{bmatrix} = \begin{bmatrix} X_{P1} - X_K & X_{P2} - X_K & X_W - X_K \\ Y_{P1} - Y_K & Y_{P2} - Y_K & Y_W - Y_K \\ Z_{P1} - Z_K & Z_{P2} - Z_K & Z_W - Z_K \end{bmatrix} [a_{P1} \ a_{P2} \ a_W]$$

Solving for $[a_{P1} \ a_{P2} \ a_W]$ $$[a_{P1} \ a_{P2} \ a_W] = \begin{bmatrix} X_C - X_K \\ Y_C - Y_K \\ Z_C - Z_K \end{bmatrix} [H_M]^{-1}$$

where $$[H_M]^{-1} = \begin{bmatrix} X_{P1} - X_K & X_{P2} - X_K & X_W - X_K \\ Y_{P1} - Y_K & Y_{P2} - Y_K & Y_W - Y_K \\ Z_{P1} - Z_K & Z_{P2} - Z_K & Z_W - Z_K \end{bmatrix}^{-1}$$

The amount of black is then $a_K = 1 - a_{P1} - a_{P2} - a_W$.

The matrix multiplication may be performed for each of the mixing regions of the production device's gamut. The mixing region is the one where $a_{P1}, a_{P2} \geq 0$. Alternatively, the mixing region can be selected in response to the coordinates of the color point C, and of the colorants produced by the destination device.

As part of the initialize routine, the inverse matching matrices $[H_M]^{-1}$ are precalculated for each mixing region and stored in the data memory of the translator (Block 23126). These precomputed, inverse matrices are used in the matching algorithms, as described below.

Next in the initialize routine, the so-called "crosswhite" $N_W$ and "crossblack" $N_K$ surface normals are calculated for each mixing region (block 23127).

$$N_W = v_1 \times v_2 \text{ (} \times \text{ indicating vector cross product)}$$

$$v_1 = (X_{P1} - X_W, Y_{P1} - Y_W, Z_{P1} - Z_W)$$

$$v_2 = (X_{P2} - X_W, Y_{P2} - Y_W, Z_{P2} - Z_W)$$

$$N_K = v_1 \times v_2$$

$$v_1 = (X_{P1} - X_K, Y_{P1} - Y_K, Z_{P1} - Z_K)$$

$$v_2 = (X_{P2} - X_K, Y_{P2} - Y_K, Z_{P2} - Z_K)$$

These surface normals are normalized vectors that are perpendicular to the planes represented by the two chromatic colorants ($P_1$, $P_2$) and the white (W) or black (K) achromatic colorants, respectively, of a given mixing region. These crosswhite and crossblack surface normals are used in the out-of-gamut correction routines as described below.

Finally, in the initialize routine, the tonal reproduction curves are loaded for the source colorants and inverse tonal reproduction curves are loaded for the destination colorant (block 23128).

To compute an inverse tonal reproduction curve, a TRC such as specified in FIGS. 18 and 19 can be simply inverted by taking the samples along the "produced" axis and determining a "requested" value necessary to generate such produced value. This results in an inverted TRC which is used on the output end of the translation mechanism. The inverted TRC is stored in the data memory 22107 in the translator system.

Of course, the initialize routine illustrated in FIG. 23 includes a number of calculations and steps. The order of the steps can be adapted for a particular implementation. Similarly, the use of the flags may or may not be necessary in a given system.

In an alternative system, the parameters and mixing equations calculated in the initialize routine may be stored as part of the source and destination profiles. In such alternative system, the computations done in the initialize routine may be done elsewhere. The initialize routine is preferred for a source and destination independent system.

A type of color correction, very important for spot color, business graphics, presentation graphics, or other graphics areas where the user has a tendency to run the color selectors to the limits, using only highly saturated, synthetic hues, is accomplished by the pseudo color transform referred to above with respect to FIG. 23 (block 23123). If the color matching system was applied to these colors without chroma correction like that achieved by the pseudo-color transform, the result would most often be a loss of saturation in the final image, this being produced by the smaller gamuts of many output technologies.

By applying a chroma mapping from the source original to the destination production gamut, relative saturation will be maintained at a loss of color matching. Users will be pleased with the results since the final color will match the intention of the user, not necessarily the color coordinates specified.

Figure 24A:
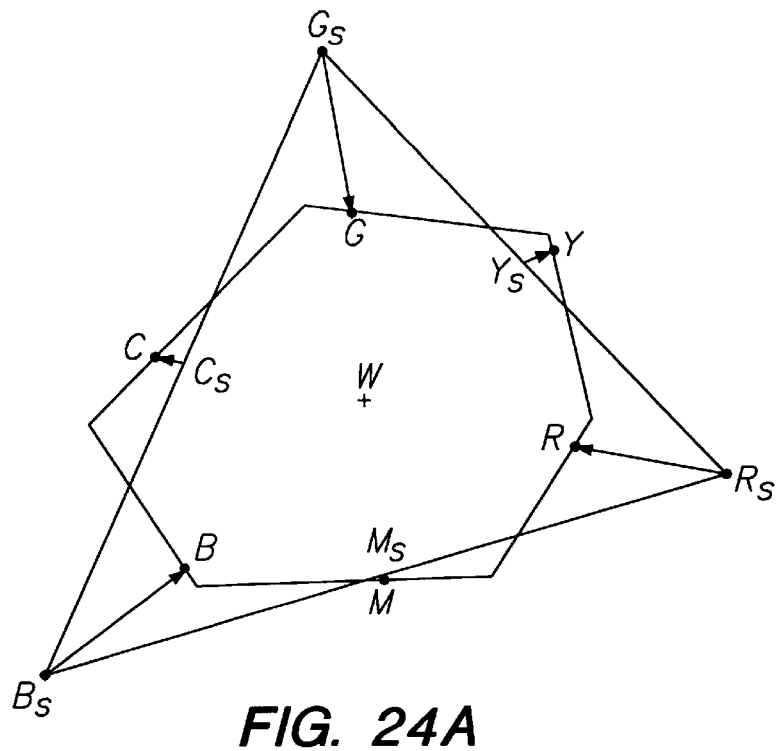
FIGS. 24A–24B illustrate pseudo-color gamut transformation according to the present invention.
Figure 24B:
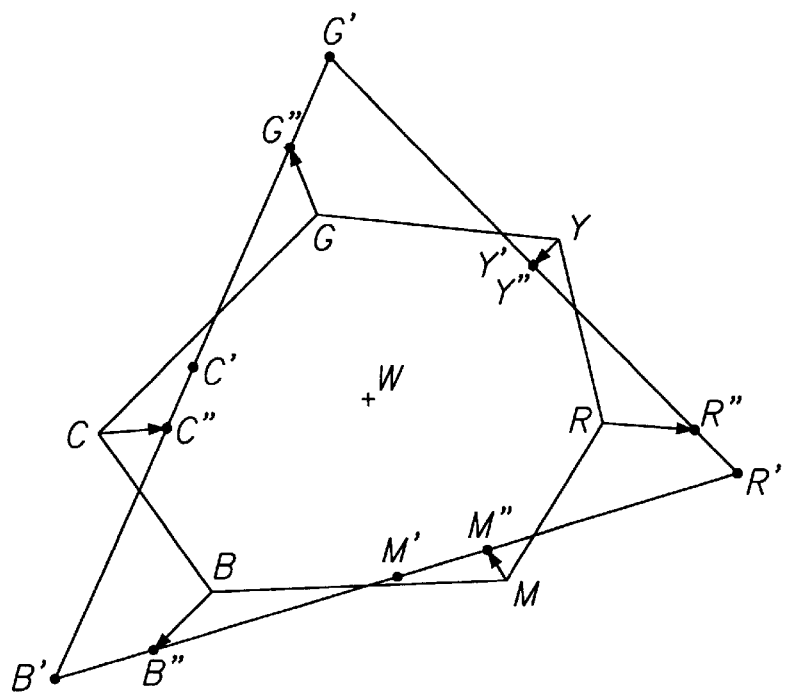

FIGS. 24A and 24B illustrate an example of the transformation for an RGB source to a QMS printer using a CMYK space. This mapping is accomplished by first projecting the source primaries ($R_S$, $M_S$, $B_S$, $C_S$, $G_S$, $Y_S$) onto the destination gamut (R', M', B', C', G', Y') along the constant hue lines from the primaries to the white point, as shown in FIG. 24A.

To calculate the intersection, the parametric equations are solved for the line segment joining two adjacent destination primaries (D1, D2) and the line segment between a source primary (S) and the white point (W) in chromaticity space:

$$x_a = x_{D1} + t_a(x_{D2} - x_{D1})$$

$$y_a = y_{D1} + t_a(y_{D2} - y_{D1})$$

$$x_b = x_W + t_b(x_S - x_W)$$

$$y_b = y_W + t_b(y_S - x_W)$$

are solved for the two parameters $t_a$ and $t_b$ $$t_a = \frac{(x_S - x_W)(y_W - y_{D1}) - (x_W - x_{D1})(y_S - y_W)}{(x_S - x_W)(y_{D2} - y_{D1}) - (x_{D2} - x_{D1})(y_S - y_W)}$$

$$t_b = \frac{(x_{D2} - x_{D1})(y_W - y_{D1}) - (x_W - x_{D1})(y_{D2} - y_{D1})}{(x_S - x_W)(y_{D2} - y_{D1}) - (x_{D2} - x_{D1})(y_S - y_W)}$$

where ($x_{D1}$, $y_{D1}$), ($X_{D2}$, $Y_{D2}$) are the endpoints of the line between two destination primaries (D1, D2) and ($x_S$, $Y_S$), ($x_W$, $y_W$) are the endpoints of the second line segment between the source primary (S) and the white point (W).

The intersections can also be represented with determinants as $$t_a = \frac{\begin{vmatrix} x_S - x_W & x_W - x_{D1} \\ y_S - y_W & y_W - y_{D1} \end{vmatrix}}{\begin{vmatrix} x_S - x_W & x_{D2} - x_{D1} \\ y_S - y_W & y_{D2} - y_{D1} \end{vmatrix}}$$

$$t_b = \frac{\begin{vmatrix} x_{D2} - x_{D1} & x_W - x_{D1} \\ y_{D2} - y_{D1} & y_W - y_{D1} \end{vmatrix}}{\begin{vmatrix} x_S - x_W & x_{D2} - x_{D1} \\ y_S - y_W & y_{D2} - y_{D1} \end{vmatrix}}$$

Each destination primary is checked against each edge of the source gamut until $0 \leq t_a \leq 1$ and $0 \leq t_b$. The parameter $t_a$ is then used to determine the point (e.g., for R') of intersection (x, y, Y) by substitution into the parametric line equation.

$$x = x_{D1} + t_a(x_{D2} - x_{D1})$$

$$y = y_{D1} + t_a(y_{D2} - y_{D1})$$

$$Y = Y_{D1} + t_a(Y_{D2} - Y_{D1})$$

The chromaticity coordinates are converted into tristimulus coordinates $$X = \frac{xY}{y}$$

$$Z = \frac{(1 - x - y)Y}{y}$$

At this point, the mixing ratios using colorants of the destination gamut for the source intersection primaries (G', Y', R', M', B', C') are calculated and stored. A mixing ratio ($a_1$, $a_2$) for the intersection primary R' may include a mixture of 85% destination red and 15% destination magenta, or $a_1 = 0.85$, $a_2 = 0.15$.

As shown in FIG. 24B, the original destination primaries (G, Y, R, M, B, C) are now projected onto the source gamut.

The intersections for this second projection are represented as $$t_a = \frac{\begin{vmatrix} x_D - x_W & x_W - x_{S1} \\ y_D - y_W & y_W - y_{S1} \end{vmatrix}}{\begin{vmatrix} x_D - x_W & x_{S2} - x_{S1} \\ y_D - y_W & y_{S2} - y_{S1} \end{vmatrix}}$$

$$t_b = \frac{\begin{vmatrix} x_{S2} - x_{S1} & x_W - x_{S1} \\ y_{S2} - y_{S1} & y_W - y_{S1} \end{vmatrix}}{\begin{vmatrix} x_D - x_W & x_{S2} - x_{S1} \\ y_D - y_W & y_{S2} - y_{S1} \end{vmatrix}}$$

Each destination primary is checked against each edge of the source gamut until $0 \leq t_a \leq 1$ and $0 \leq t_b$. The parameter $t_a$ is then used to determine the point of intersection (x, y, Y) by substitution into the parametric line equation.

$$x = x_{S1} + t_a(x_{S2} - x_{S1})$$

$$y = y_{S1} + t_a(y_{S2} - y_{S1})$$

$$Y = Y_{S1} + t_a(Y_{S2} - Y_{S1})$$

The chromaticity coordinates are converted into tristimulus coordinates $$X = \frac{xY}{y}$$

$$Z = \frac{(1-x-y)Y}{y}$$

A new set of twelve pseudo-color primaries (G", G', Y", Y', R", R', M", M', B", B', C", C') is created from these primaries and the source intersection primaries. This results in a transformed destination gamut which completely maps to the source gamut. The full relative saturation range represented in the source gamut is represented in the destination gamut and the hues are maintained.

When a sample color is matched, the colorant amounts are determined by using the mixing ratios calculated in the first projection step.

The final amounts for the two natural destination colorants ($a_{P1N}$, $a_{P2N}$) can be calculated from the amounts ($a_{P1}$, $a_{P2}$) computed using the pseudo-color primaries by using one of the four cases. The mixing ratio for the projected destination colorants is also assumed in these equations to be 1 for the first component $a_1$ and 0 for the second component $a_2$.

Case 1: Both bounding pseudo colorants are projected destination colorants.

$$a_{P1N} = a_{P1}$$

$$a_{P2N} = a_{P2}$$

Case 2: The most clockwise pseudo colorant $a_{P1}$ is a projected destination colorant and the other $a_{P2}$ is source colorant.

$$a_{P1N} = a_{P1} + a_{P2}(a_1)_J$$

$$a_{P2N} = a_{P2}(a_2)_J$$

Case 3: The most clockwise pseudo colorant $a_{P1}$ is a source colorant and the other $a_{P2}$ is a projected destination colorant.

$$a_{P1N} = a_{P1}(a_1)_i$$

$$a_{P2N} = a_{P1}(a_2)_i + a_{P2}$$

Case 4: Both bounding colorants are source colorants.

$$a_{P1N} = a_{P1}(a_1)_i + a_{P2}(a_1)_J$$

$$a_{P2N} = a_{P1}(a_2)_i + a_{P2}(a_2)_J$$

These four sets of equations can be simplified to the following pair of equations:

$$a_{P1N} = a_{P1}(a_1)_i + a_{P2}a_{C1}$$

$$a_{P2N} = a_{P1}(a_2)_i + a_{P2}a_{C2}$$

where $a_{P1}$ and $a_{P2}$ are the originally calculated destination primary amounts $a_1$ and $a_2$ are the stored mixing ratios for the primaries indexed by the current mixing region, and $a_{C1}$ and $a_{C2}$ are calculated from the following method.

j=index of the previous mixing region
if $(a_1)_J = 1.0$ then
$a_{C1} = 0.0$
$a_{C2} = 1.0$
else
$a_{C1} = (a_1)_J$
$a_{C2} = (a_2)_J$ This logic assures that when two original destination primaries bound a mixing region, the $a_{P1}$ and $a_{P2}$ values will be unaffected by mixing ratios. When pseudo primaries define all or part of a mixing region, the mixing ratios will be correctly added into the final colorant amounts.

Using this technique, the mixing equations are solved as if the destination device had a transformed gamut having the twelve pseudo primaries of FIG. 24B. A point lying outside the actual destination gamut will lie within the transformed gamut, and result in computation of actual colorant amounts that preserve relative saturation within the actual gamut.

Figure 25:
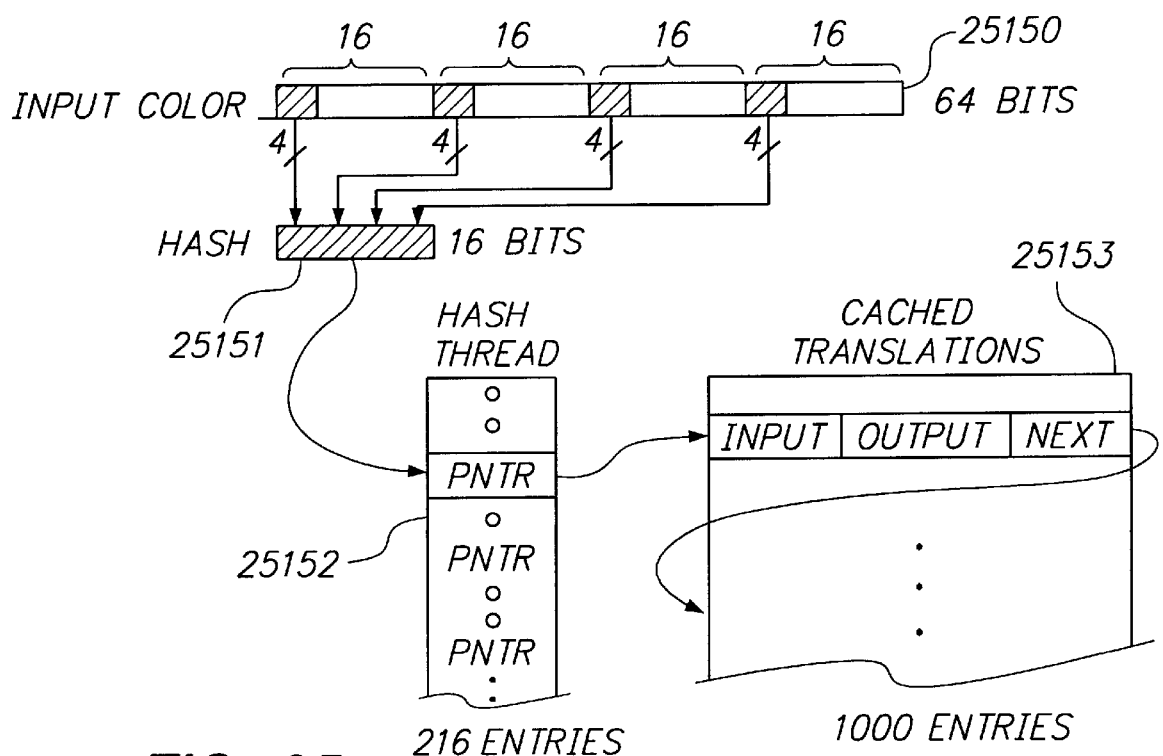
FIG. 25 is a heuristic diagram of a color translation cache according to the present invention.

FIG. 25 illustrates the implementation of the cache in one embodiment of the present invention. In the embodiment of FIG. 25, the input color 25150 is represented by 4 sixteen bit bytes, each byte representing one of the three chromatic colorants and an achromatic colorant of the source device. This input color 25150 is hashed by any one of a number of algorithms. In the preferred system, the first four bits of each of the 4 sixteen bit bytes of the input color are used to create a hash value. This hash value 25151 is used to access a hash thread 25152.

The hash thread includes $2^{16}$ entries. Each entry stores either zero or a pointer to translations in cache buffer 25153. The buffer 25153 includes 1000 entries in the preferred system. Each entry includes the 64 bit input color, a corresponding 64 bit output color, and a pointer to a next value in a linked list, or zero, as the pointer value. Thus, if a cache translation exists for an input color which has the same hash value, then a pointer will be found at hash thread 25152. This pointer will point to a linked list of translations. The linked list is searched to determine whether a match is found. If a match is found, then a cache hit has occurred, and the translated output can be directly supplied.

Figure 26:
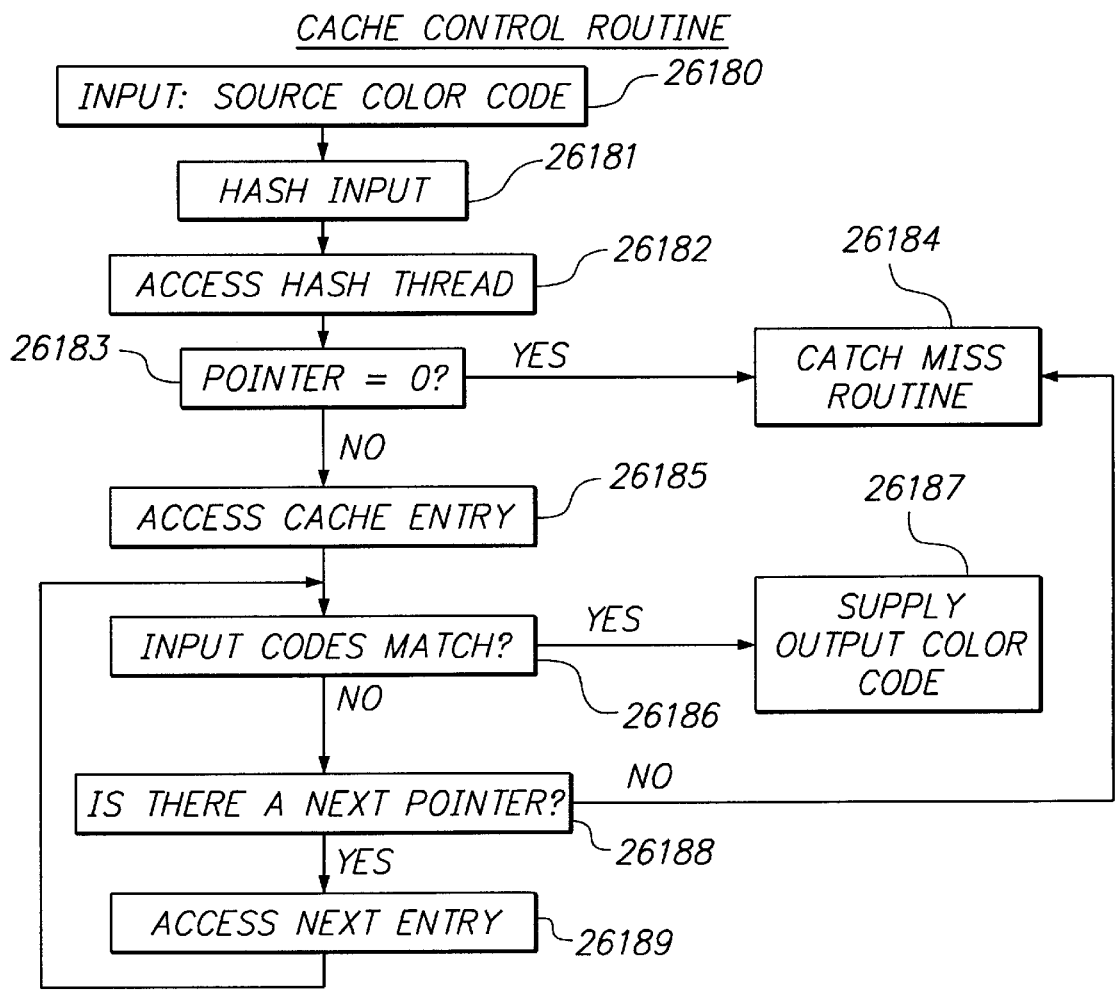
FIG. 26 is a flowchart of a cache control routine according to the present invention.

Thus, a cache control routine, as illustrated in FIG. 26, is stored in the program store of the translator illustrated in FIG. 22. The input to the cache control routine includes a source color code (block 26180). First step in the routine is to hash the input value (block 26181). Next, the hash thread is accessed with the result of the hashed input color (block 26182).

If the hash thread pointer is equal to zero, as determined in block 26183, then a cache miss has occurred, and a cache miss routine is called (block 26184).

If the pointer is not equal to zero, then the cache buffer entry is accessed (block 26185). The input codes are compared in block 26186. If a match occurs, then the output color code is supplied (block 26187). If they do not match, the next pointer is tested (block 26188). If the next pointer is non-zero, then the next entry in the cache is accessed (block 26189). If there is no next pointer, then the cache miss routine is called (block 26184).

Figure 27:
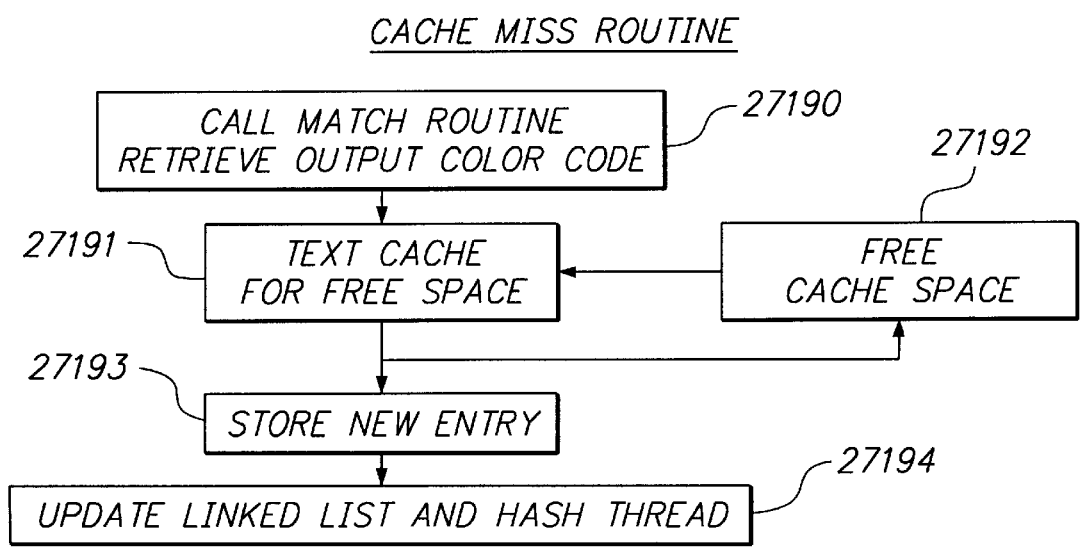
FIG. 27 is a flowchart of a cache miss routine according to the present invention.

FIG. 27 illustrates a cache miss routine. The first step in the cache miss routine is to call the match routine of the translator and retrieve an output color code (block 27190). Next, the cache buffer 25153 is tested for free space (block 27191). If the buffer is full, then cache space is freed (block 27192). A variety of algorithms can be used for freeing cache space, such as a least recently used algorithm, or others. It is found in one implementation that once the cache buffer is full, the space can be freed by simply zeroing the hash thread table. This has the result of losing all prior stored translations, but the cache system, nonetheless, provides a significant increase in performance during translation of a given image.

If there is free cache space, then the new entry is stored in the buffer (block 27193). Finally, the linked list and hash thread tables are updated (block 27194).

Figure 28:
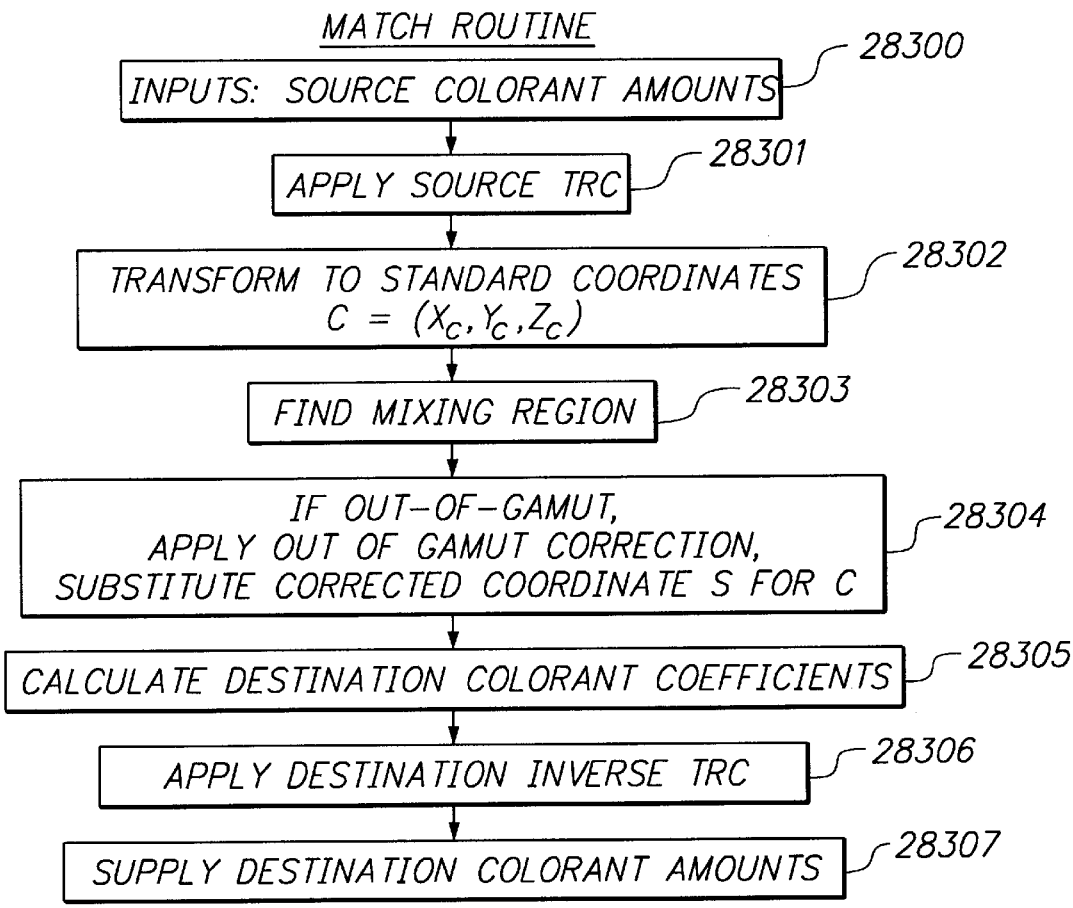
FIG. 28 is a flowchart of the matching routine according to the present invention.

FIG. 28 illustrates the match routine stored in the translator of FIG. 22. The inputs to the match routine include the source color amounts (block 28300).

The first step of the match routine is to apply to the source TRC (block 28301) to account for any anomalies in the source device. Of course, if the source device is a virtual device using a color space, either calibrated or uncalibrated, there may be no TRC correction necessary.

The next step is to transform the corrected colorant amounts to standard calibrated coordinate system (block 28302). In the preferred system, the colorant amounts are transformed to the same coordinates in which the profiles have been specified. Again, in the preferred system, this is the CIE tristimulus coordinate space specified by the XYZ coordinates. Details of this transformation are set out below.

Next, the mixing region in which color point is found is determined (block 28303). The routine for determining the mixing region is illustrated with respect to FIGS. 29 and 30 set out below.

Next it is determined whether the coordinate of the sample color is out-of-gamut, and if it is out-of-gamut, then the out-of-gamut correction routine illustrated with respect to FIGS. 31–34 is applied. The projected value S from the out-of-gamut routine is determined. This corrected coordinate S is substituted for the transform coordinate C of the color (block 28304).

Finally, the destination color coefficients for the sample are calculated using the inverse matching matrices stored during, or before, initialization (block 28305). Out-of-gamut detection may be made after solving the mixing equations, in which case the corrected coordinate S is used to recalculate colorant amounts. Also, other exception conditions may be detected, and corrected for. There are several exception conditions that must be solved. The first conditionals are when $Y_C > Y_W$, and $Y_C < Y_K$. They can be treated as:

when $Y_C > Y_W$, then $a_{P1}$, $a_{P2}$, $a_W$, $a_K = 0$ when $Y_C < Y_K$, then $a_{P1}$, $a_{P2}$, $a_W = 0$, and $a_K = 1$ This clips colors higher or lower in luminance than the white and black of the production device to the white or black of the device. This clip should be applied prior to the hextant determination step to speed processing.

The third exception condition is the case where $a_{P1} + a_{P2} + a_W > 1$ or $a_W < 0$ This case arises when the sample color is outside of the production device's color gamut.

These colorant amounts calculated in block 305 are then applied to the destination inverse TRC to account for any anomalies in the destination device (block 28306). Finally, the destination colorant amounts are supplied to the destination device (block 28307).

Transforming the input colorant amounts to the calibrated color space in a preferred system may be accomplished by first categorizing the various color graphics devices as an RGB type device or a CMYK type device. In one preferred system, the RGB type devices are first translated using the TRC curves to an RGB value (R', G', B'). The RGB actual value is then translated to a CMYK-linear value, according to the following equations:

C=1−R'

M=1−G'

Y=1−B'

K=0

The CMYK type devices are translated to the CMYK-linear space by transforming the colorants using the TRCs. In this way, all of the source and destination devices which can be categorized in the RGB or CMYK classes, are translated to a CMYK-linear coordinate. This CMYK-linear coordinate must then be translated to an XYZ coordinate space. This is accomplished by the following computation:

$K_{add}$=min (C, M, Y)

C'=C−$K_{add}$

Y'=Y−$K_{add}$

M'=M−$K_{add}$

K'=max (K'+$K_{add}$, 1.0)

R=min (M', Y')

G=min (C', Y')

B=min (C', M')

C''=C'−(B+G)

M''=M'−(R+B)

Y''=Y'−(R+G)

W=1.0−C''−M''−Y''−R−G−B−K'

$$\begin{bmatrix} X \\ Y \\ Z \end{bmatrix} = \begin{bmatrix} X_R & X_G & X_B & X_{C''} & X_{M''} & X_{Y''} & X_K & X_W \\ Y_R & Y_G & Y_B & Y_{C''} & Y_{M''} & Y_{Y''} & Y_{K'} & Y_W \\ Z_R & Z_G & Z_B & Z_{C''} & Z_{M''} & Z_{Y''} & Z_{K'} & Z_W \end{bmatrix} \begin{bmatrix} R \\ G \\ B \\ C'' \\ M'' \\ Y'' \\ K' \\ W \end{bmatrix}$$

Figure 30:
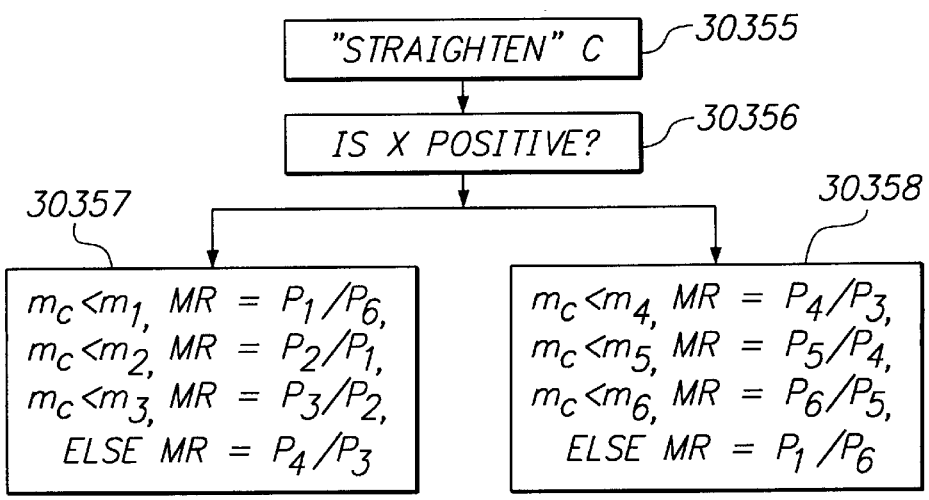
FIG. 30 is a flowchart of a select mixing region routine according to the present invention.
Figure 29:
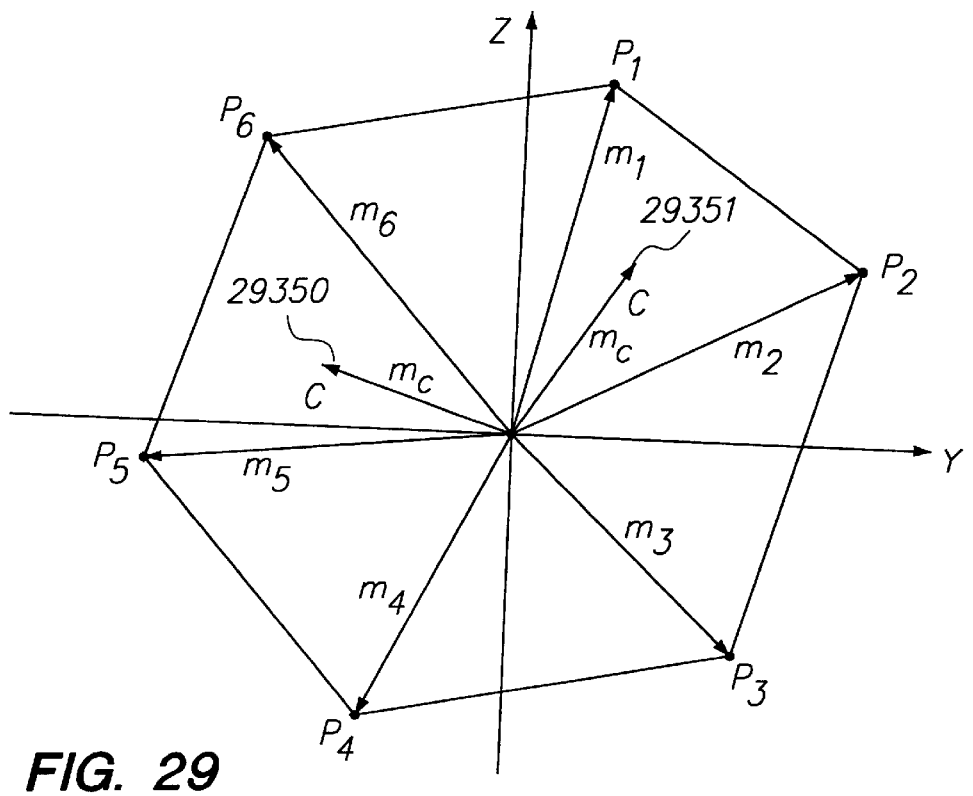
FIG. 29 is a graph used to illustrate mixing region selection according to the present invention.

The technique used in the match routine for finding the mixing region is illustrated with respect to FIGS. 29 and 30. FIG. 29 illustrates a gamut of a destination device which has been initialized by the initialize routine. Thus, the coordinates of each of the chromatic colorants $P_1$ through $P_6$ are prestored. Also, the slopes $m_1$ through $m_6$ are prestored during the initialize routine. Finally, the maxY and minY values for each mixing region are determined. As illustrated in FIG. 29, each of the vectors for which the slopes are calculated originate with a point on the achromatic axis of the destination device and extend to a chromatic colorant.

FIG. 29 illustrates two color samples 29350 and 29351. The mixing region for a given color sample C can be quickly determined by comparing the slopes of the vectors from the achromatic point to the chromatic colorants with the slope of the vector from the achromatic point to the sample C. The routine for selecting the mixing region according to the present invention in a preferred embodiment is illustrated in FIG. 30. In the first step, a "straighten" C algorithm is carried out (block 30355). According to this algorithm, the coordinates of the point C are adjusted by the same amount as the gray axis adjustment, which is performed in the initialize routine.

The "straighten" coordinates $X'_C$, $Y'_C$, $Z'_C$ are calculated as follows:

$$X'_C = X_K + \frac{X_C - X_K}{Y_W - Y_B}(X_W - X_K)$$

$$Y'_C = Y$$

$$Z'_C = Z_K + \frac{Z_C - Z_K}{Y_W - Y_K}(X_W - X_K)$$

This adjustment accounts for the difference in the positions of the achromatic axes in the source and destination devices. Thus, with reference to FIG. 20, it can be seen that a point located between the achromatic axes of a source and destination device may originate in the source device in the mixing region between colorants $Y_1$ and $R_1$ but appear in a destination color gamut as residing in the mixing region between colorants $B_2$ and $C_2$. The gray axis correction routine ensures that the hue of these colors near the gray axes is maintained in the destination device.

Next, it is determined whether the X coordinate of the sample colorant C is positive or negative (block 30356). If it is positive, then the routine runs the test illustrated in block 30357. If X is negative, then the routine runs the test illustrated in block 30358.

The test run for positive X includes comparing the slope $m_C$ with the slope $m_1$, if $m_C$ is less than $m_1$, then the mixing region is between $P_1$ and $P_6$. If the slope is not less than $m_1$, but less than $m_2$, then the mixing region is between colorants $P_2$ and $P_1$. Finally, if $m_C$ is not less than $m_2$, but less than $m_3$, then the mixing region is between colorants $P_3$ and $P_2$. If the slope $m_C$ does not meet any of the previous tests, then the mixing region is between $P_4$ and $P_3$.

If the X coordinate is negative, then the complementary tests in block 30358 are run.

Therefore, for the point 29351, the algorithm will determine first that the point C has a positive X coordinate. It will then compare the slope $m_C$ to the slope $m_1$, where the slope is equal to the Z coordinate of the colorant minus the Z coordinate of the achromatic point divided by the X component of the colorant minus the X component of the achromatic point. It will be determined that the slope $m_C$ is greater than the slope $m_1$. Therefore, the next test will be run. $m_C$ will be compared with $m_2$. It will then be determined that $m_C$ is less than $m_2$. The mixing region will have been found in two comparisons. For the point 29350, searching will being at colorant $P_4$ because it will be determined that X is negative. Since the slopes $m_4$ and $m_5$ are greater than $m_C$, comparison of $m_C$ to $m_6$ will be made. Since it will be determined that $m_C$ is less than $m_6$, the mixing region is $P_6/P_5$ will have been determined in three comparisons.

As part of the initialize routine, the starting colorant for the routine selecting the mixing region is determined by selecting a colorant having a positive X value of lowest magnitude, and a colorant having a negative X value of lowest magnitude.

Thus, the searching of the colorant vectors has a first starting point for calculated points in one region of the space, and a second starting point for calculated points in a second region of the space. In this way, the length of the searches necessary to determine the mixing region can be reduced by as much as one-half.

By selecting the mixing region in response to the slopes which have been precomputed in the initialize routine, the run time of the match algorithm is greatly reduced.

Figure 31:
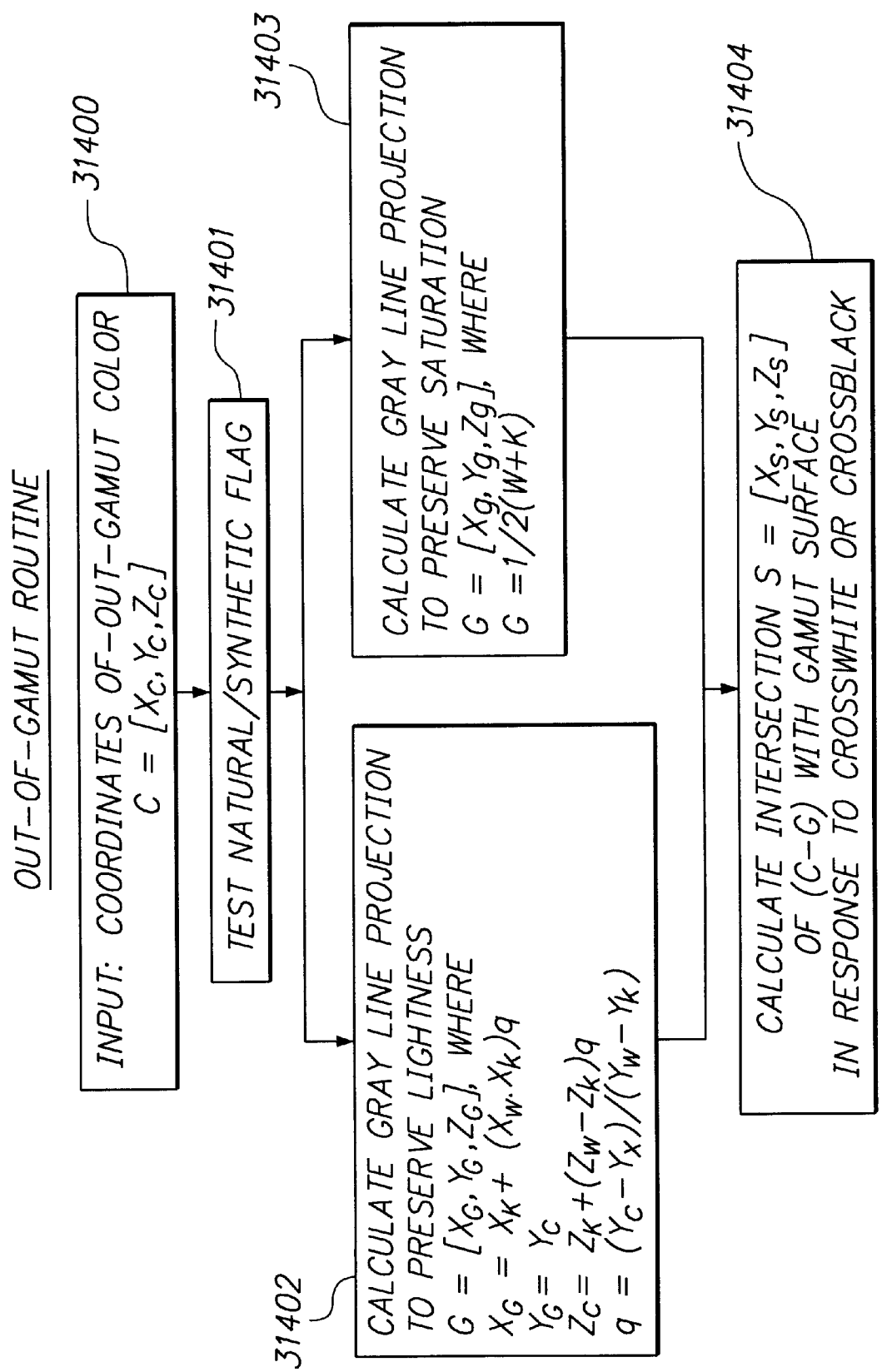
FIG. 31 is a flowchart of the out-of-gamut adjustment routine according to the present invention.

FIGS. 31–35 illustrate the out-of-gamut routine of the present invention. FIG. 31, the basic algorithm, is illustrated. The inputs to the out-of-gamut routine include the coordinates of the color to be matched (block 31400). Next, the natural/synthetic flag is tested if the pseudo color transform described with respect to FIGS. 24A and 24B is not done (block 31401). If the natural flag is set, then the out-of-gamut routine operates to preserve the lightness on the sample of the destination device based upon a gray line projection G calculated as shown in the figures (block 31402). If the synthetic flag is set, then the out-of-gamut routine operates to preserve a different parameter, such as chromaticity or saturation, of the source color on the destination device based upon a gray line projection calculated as shown (block 31403). As explained below, the out-of-gamut routine can be adapted to preserve other characteristics by the gray line projection.

Figure 32:
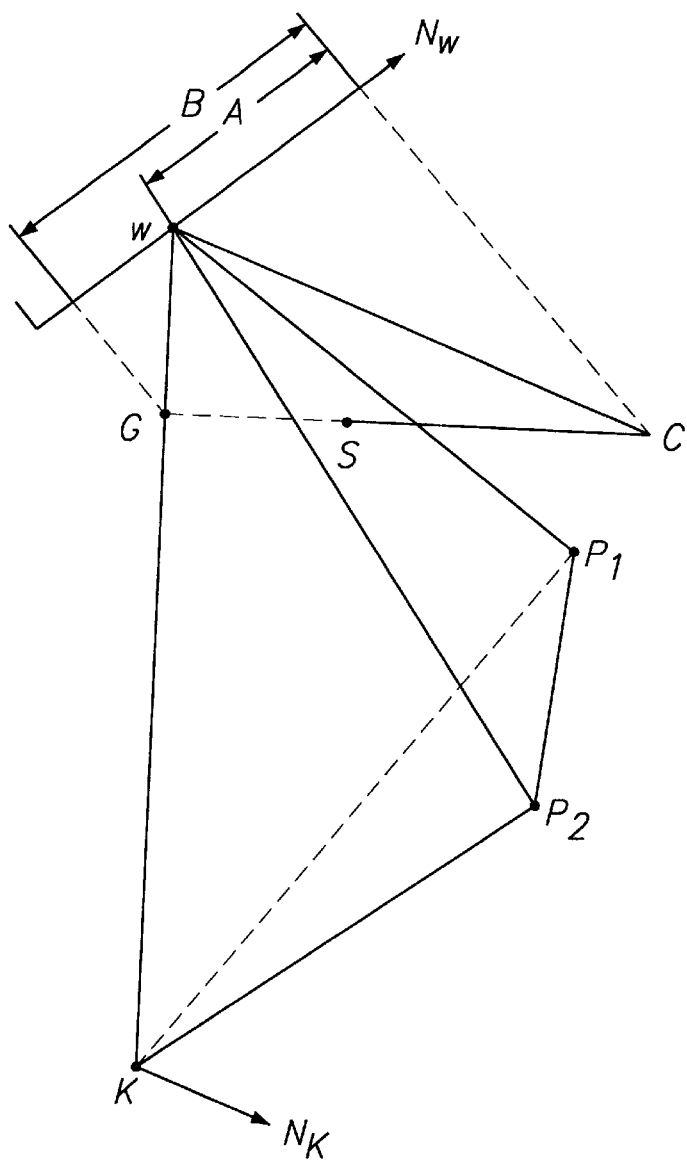
FIG. 32 is a graph of a color mixing region in a calibrated color space according to the present invention used for explaining the out-of-gamut correction routine.

If the natural flag to preserve lightness is set, then the gray line projection is calculated as illustrated in FIG. 32.

FIG. 32 illustrates a color mixing region between colorants $P_1$ and $P_2$. As described above, with respect to the initialize routine, the crosswhite $N_W$ and the crossblack $N_K$ vectors have been precalculated and are normal to the surface defined by $P_1$, $P_2$, and W, and $P_1$, $P_2$, and K, respectively. The color point coordinate C is clearly shown out of the gamut of the mixing region. In order to preserve lightness, this point C is projected onto the gray axis between W and K at a point G having the same lightness as the point C.

Figure 34:
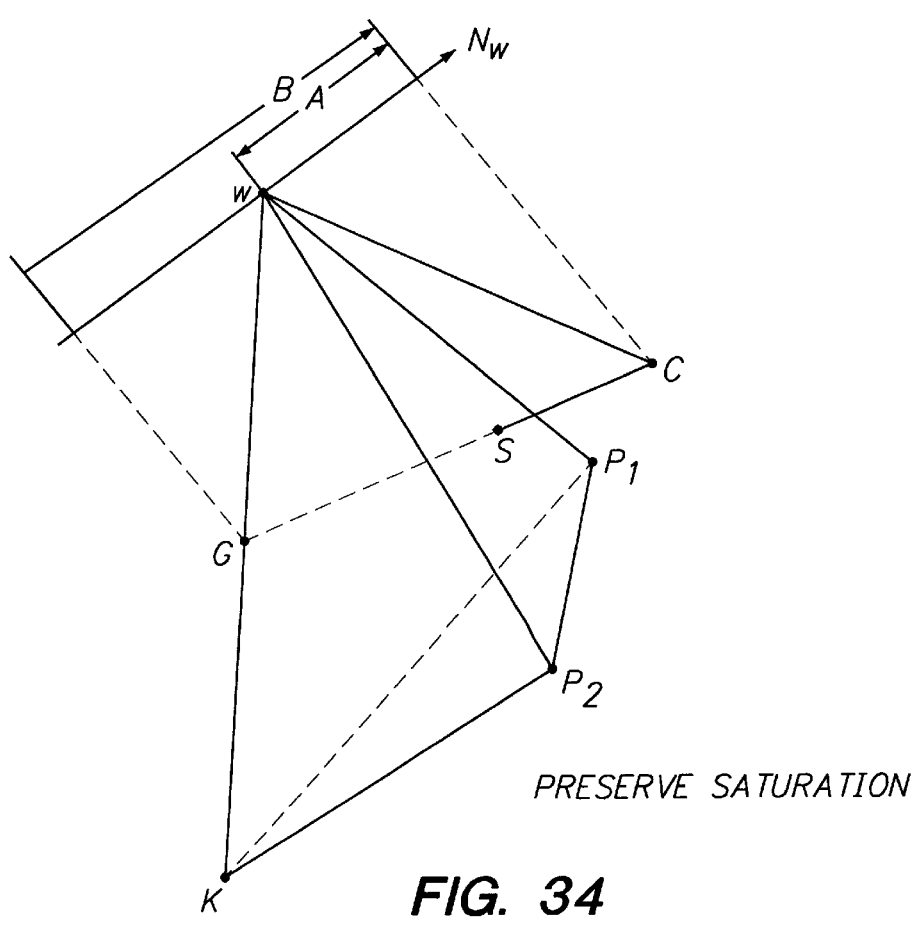
FIG. 34 illustrating an alternative out-of-gamut adjustment according to the present invention.

In FIG. 34, the gray line projection for preserving saturation is illustrated. As can be seen, this projection is calculated so that G lies at a point midway between white W and black K on the gray axis.

Figure 33:
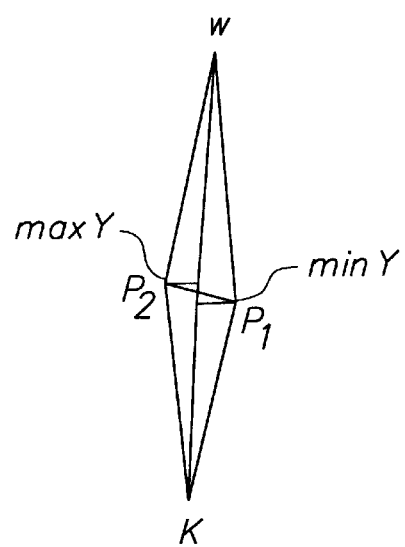
FIG. 33 is a graph of a color mixing region used to illustrate a portion of the out-of-gamut routine according to the present invention.

Finally, the routine calculates the intersection point S of the vector between C and G with the gamut surface in response to the crosswhite and crossblack vectors (block 31404). This routine is illustrated in FIG. 35. The first step is to test the Y coordinate of the color C against the maxY value which has been prestored (block 35410). This maxY value is illustrated in FIG. 33. As can be seen, the coordinates of the colorants $P_1$ and $P_2$ typically will not have the same Y value. Thus, the highest Y value of the coordinates of the colorants $P_1$ and $P_2$ is set equal to maxY and the lowest Y value of the coordinate of the colorants $P_{P1}$ and $P_2$ is set equal to minY.

As illustrated in FIG. 35, if the Y coordinate of the sample C is less than maxY, then the values A, B, and $t_K$ are calculated as illustrated in block 35411, where the vector [C–G] is the vector between the points C and G and the vector [C–K] is the vector between points C and K on FIG. 35. The dot products of these vectors with the crossblack vector are used to calculate the parameters A and B in this set.

Next, if the value Y of the sample C is greater than minY (block 35412), then the parameters A, B, and $t_W$ are calculated as illustrated in block 35413. In block 35413, the values A and B are determined by the dot products of the vectors [C–G] with crosswhite and [C–W] with crosswhite as shown in FIG. 33. Therefore, the value A is a projection along the crosswhite vector $N_W$ of the vector between the points W and C. Similarly, the value B is a projection of the vector between C and G on the crosswhite vector $N_W$. The ratio of B to A is a parameter $t_W$ indicating the relative lengths of [C–S] and [S–G].

In the next step, it is determined whether to use the projections from crosswhite or crossblack in order to calculate the point S, if both have been calculated (block 35414). Thus, if the Y of the sample C is both less than maxY and greater than minY, then the factor t is selected as the maximum of $t_W$ and $t_K$. Otherwise, t is the calculated value of $t_W$ or $t_K$. In the illustration in FIG. 32, the t will be equal to $t_W$, because the Y value of C is not less than maxY, but is greater than minY. Thus, only $t_W$ is calculated.

Finally, the coordinates of the point S are calculated as illustrated in block 35415 of FIG. 35. This yields a point on the surface of the mixing region having the same lightness as the point C as illustrated in FIG. 32.

Applying the same calculations to the illustration in FIG. 34 used in the synthetic case, the sample S has the coordinates on the surface of the destination gamut which preserves well the chromaticity component of the point C.

As can be seen, the out-of-gamut projection can be adapted to produce a variety of effects by changing the gray line projection. However, the algorithm for calculating the surface intersection does not change. Thus, the algorithm according to the present invention is very flexible in achieving a variety of color effects for out-of-gamut corrections and accommodates software selectable flags for adapting out-of-gamut corrections.

FIG. 36 is a schematic diagram of an alternative color translator system according to the present invention. The components in FIG. 36 that are common with FIG. 22 are given like reference numbers. In this system, the translator is enhanced by including an integrated circuit matrix multiplier 36500. The initialize routine in the program memory 22106 is modified in this embodiment so that upon precomputing the inverse matching matrices, registers 36501 in the matrix multiplier IC 36500 are preloaded with the calculated values. In the matching routine, the matrix multipliers utilize the preloaded registers to perform the colorant determination. By using integrated circuit matrix multiplier, having a plurality of matrix multipliers integrated on a single chip, one matrix multiplier can be initialized for each of the mixing regions. When the match routine is executed, the matrix multiplication used to calculate the colorants for the destination device can be accomplished in hardware, greatly increasing the speed performance of the system.

V. CONCLUSION

Accordingly, a universal color processing system is provided based on providing a color data structure which associates a color space with color data. In response to color data structures with associated color spaces, a color processing engine implements a wide variety of processing techniques which are source and destination device blind. This greatly increases the flexibility and ease of use of color graphics systems, which work in a variety of color spaces with a variety of data formats.

Furthermore, because the color processor of the present invention may operate in a working color space which is independent of the source and destination spaces, a programmer operating in with the color graphics system of the present invention may rely on a familiar working color space in order to process colors, no matter where the colors are generated in the first instance. Thus, if a user desires to alter only the luminance of a given input color, the user of the color graphics system may operate in the HLS space in which the hue is indicated by a radial position about an axis, the luminance is defined by a vertical position along the axis, and the saturation is defined by a distance from the luminance axis. The color processing system of the present invention allows the user to first convert the input color from an arbitrary color space into the HLS space. Then, the single component of the HLS space, the luminance, which he wants to manipulate can be individually manipulated using the clamping, filtering, and operators of the present invention. For supply back to a destination device, the data is then converted out of the HLS space into the arbitrary destination device space. This allows users to manipulate color within a color space that is best suited to the particular manipulations desired.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for processing color information in a computer system, comprising:

specifying in a first memory location a source color in a color data structure; the color data structure including a colorspace field, a colorset field, a colorprofile field and a color data field, the color data structure being arranged to store color data associated with a source color space which may be one of a variety of color spaces including algorithmic and indexed color spaces, wherein the colorspace field contains an indication of the source color space if the source color space is an algorithmic color space, the colorset field contains an indication of possible indexed colors if the source color space is an indexed color space, and the colorprofile field can contain a characterization of the color space; the color data structure including a source color space parameter set identifying the source color space and source color data indicating components in the source color space, the source color space being user selected from a set of color spaces;

specifying in a second memory location a destination color in a data structure including a destination color space parameter set identifying a destination color space, the destination color space being user selected from the set of color spaces; and computing with a processor coupled to the first and second memory locations a resultant color data structure in response to the source color data, the source color space parameter set and the destination color space parameter set, the resultant color data structure including resultant color data indicating components in the destination color space.

2. The method of claim 1, wherein the step of computing includes:

first converting in response to the source color space parameter set with the processor the source color data structure into a working color data structure having working color data indicating components in a working color space and storing the working color data structure in a working memory; and second converting with the processor the working color data structure into the resultant color data structure.

3. The method of claim 1, wherein the step of computing includes:

providing to the processor a color operator specifying a function and executing the function.

4. The method of claim 3, wherein the color operator specifies a working color space, and the step of executing the function includes:

first converting with the processor the source color data structure into a working color data structure having working color data indicating components in the working color space and storing the working color data structure in a working memory;

operating with the processor on the working color data in the working memory; and second converting with the processor the working color data structure into the resultant color data structure.

5. The method of claim 4, wherein the operator specifies functions which operate on a per component basis in the working color space.

6. The method of claim 3, wherein the operator specifies functions which operate on a per component basis.

7. The method of claim 1, wherein the source color space parameter set and destination color space parameter set include a first member identifying a data packing format and a second member identifying an algorithmic color space.

8. The method of claim 1, wherein the source color is stored in an algorithmic color space and the contents of the colorset field is nil.

9. The method of claim 1, wherein the colorspace field also contains color packing data.

10. The method of claim 1, wherein the color profile field contains an indication of the primary colorants within the color space, tonal reproduction curves and matching flags.

11. The method of claim 1, wherein the source color is stored in an indexed color space and the contents of the colorspace field contains the index.

12. The method of claim 11, wherein the source color is stored in an indexed color space and the contents of the colorprofile field is nil.

13. The method of claim 1, wherein the source color is converted from an indexed to an algorithmic color space.

14. A computer operating system for processing color data to produce a resultant color on a destination color graphics device, comprising:
 a memory to store at least one color data structure; the color data structure including a colorspace field, a colorset field, a colorprofile field and a color data field, the color data structure being arranged to store color data associated with a color space which may be one of a variety of color spaces including algorithmic and indexed color spaces, wherein the colorspace field contains an indication of the color space if the color space is an algorithmic color space, the colorset field contains an indication of possible indexed colors if the color space is an indexed color space, and the colorprofile field con contain a characterization of the color space; the color data structure having data identifying a color including a color space parameter set identifying a color space, the color space being user selected from a set of color spaces, and component data indicating components of the color in the color in the color space;
 color processing means, coupled to the memory and responsive to the at least one color data structure in the memory and a destination color space, the destination color space being user selected from the set of color spaces, for the destination color graphics device, for generating resultant color data indicating components of the resultant color in the destination color space.

15. The system of claim 14, wherein the color space parameter set includes a color profile, including components of primary colorants in the color space of the color data structure.

16. The system of claim 15, wherein the color profile further includes tonal reproduction curves for colorants of color graphic devices.

17. The system of claim 14, wherein the color space identified in the at least one color data structure is selected from a set of color spaces, and the set of color spaces includes a first subset of algorithmic color spaces, wherein the color component data of the algorithmic color spaces includes the components within a color coordinate system of a color of the algorithmic color spaces, and a second subset of indexed color spaces, wherein the color component data of the indexed color spaces includes a pointer to an entry in a list where entries in the list comprise color components within a color coordinate system of respective colors of the indexed color spaces.

18. The system of claim 14, wherein the resultant color data of said color processing means comprises a resultant color data structure including data identifying the destination color space and the resultant color data.

19. The system of claim 14, wherein the color processing means includes:
 a color matching module, coupled to the memory, to generate resultant color data which results in a color in the destination color space which substantially matches the color identified by the color data structure.

20. The system of claim 14, wherein the memory stores at least a first color data structure and a second color data structure, and the color processing means includes:
 color combining means, coupled to the memory and responsive to the color component data of the first color data structure and of the second color data structure, for generating the resultant color data as a function of the components of the first and second colors.

21. The system of claim 20, wherein the second color data structure includes data which identifies a color currently displayed on the destination device.

22. The system of claim 20, wherein the color combining means includes:
 first converting means for converting the first color data structure and the second color data structure into respective first and second working color data in a common working color space indicating components in the working color space of the respective colors identified by the first and second color data structures;
 means for operating on the first and second working color data to generate intermediate color data indicating components in the working color space of a resultant color; and
 second converting means for converting the intermediate color data into the resultant color data.

23. The system of claim 22, wherein the means for operating is responsive to operators specifying functions for combining the first and second working color data on a per component basis.

24. The system of claim 14, wherein the color space parameter set of the at least one color data structure further includes data identifying a data packing format.

25. The system of claim 20 wherein the destination device has a destination store for storing color data in a data packing format, and the color combining means includes:
 first converting means for converting the first color data structure and the second color data structure into respective first and second working color data in a common working color space with a common data packing format indicating components in the working color space of the respective colors identified by the first and second color data structures;
 means for operating on the first and second working color data to generate intermediate color data indicating components in the working color space of a resultant color; and
 second converting means for converting the intermediate color data into the resultant color data in the data packing format of the destination device.

26. The system of claim 24, wherein the destination device has a destination store for storing color data in a data packing format independent of the data packing format of the at least one color data structure, and the color processing means includes:

means for packing the resultant color data in the data packing format of the destination device.

27. A system for combining first color data identifying a first color, the first color data including components of the color in a first color space, with second color data identifying a second color, the second color data including components of the second color in a second color space, to generate resultant data identifying a resultant color in a resultant image, comprising:

memory to store the first and second color data, the first and second data structure arranged into first and second color data structures, the first and second color data structures including a colorspace field, a colorset field, a colorprofile field and a color data field, the color data structures being arranged to store color data associated with a color space which may be one of a variety of color spaces including algorithmic and indexed color spaces, wherein the colorspace field contains an indication of the color space if the source if the source color space is an algorithmic color space, the colorset field contains an indication of possible indexed colors if the source color space is an indexed color space, and the colorprofile field can contain a characterization of the color space;

first converting means coupled to the memory for converting the first color data identifying the first color in the first color space and the second color data identifying the second color in the second color into first and second working color data identifying components of the first and second colors in a common working color space, wherein the first and second color spaces are different;

means, coupled to the first converting means, for operating on the first and second working color data to generate intermediate color data indicating components in the working color space of a resultant color; and second converting means, coupled to the means for operating, for converting the intermediate color data into the resultant color data for the resultant image.

28. The system of claim 27, wherein the means for operating includes:

means, coupled to the memory, for testing the first working color data to determine whether a component of the first color satisfies a range condition; and means, responsive to the means for testing, for conditionally affecting the means for operating.

29. The system of claim 27, wherein the means for operating includes:

first means, coupled to the memory, for testing the first working color data to determine whether a component of the first color satisfies a first range condition;

second means, coupled to the memory, for testing the second working color data to determine whether a component of the second color satisfies a second range condition; and means, responsive to the first and second means for testing, for conditionally affecting the means for operating.

30. The system of claim 27, wherein the means for operating includes:

means, coupled to the first converting means, for testing the intermediate working color data to determine whether a component of the resultant color satisfies a range condition; and means, responsive to the means for testing, for conditionally altering the intermediate working color data.

31. The system of claim 27, wherein the means for operating includes:

a control input store to store a function code and to store first and second matrices of control parameters;

first means, coupled to the control input store and responsive to the first matrix, for filtering the first working color data to generate first filtered data;

second means, coupled to the control input store and responsive to the second matrix, for filtering the second working color data to generate second filtered data; and means, coupled to the first means, second means, and control input store responsive to a function code, for combining the first and second filtered data to generate the intermediate working color data.

32. The system of claim 31, wherein the first and second matrices include a scale factor for each component of the respective first and second working color data.

33. The system of claim 32, wherein the first and second matrices include an offset factor for each component of the respective first and second working color data.

34. The system of claim 27, wherein the means for operating includes:

a control input store to store an output matrix of control parameters; and means, coupled to the control input store and responsive to the output matrix, for filtering the intermediate working color data.

35. The system of claim 34, wherein the output matrix includes a scale factor for each component of the intermediate working color data.

36. The system of claim 35, wherein the output matrix includes an offset factor for each component of the intermediate working color data.

37. The system of claim 27, wherein the second means for converting converts the intermediate data into data indicating components of the resultant color in the second color space.

38. The method of claim 1, further including:

producing on a destination color graphics device a resultant color in response to the resultant color data.

39. The system of claim 14, further including:

a destination interface, coupled to the color processing means, to supply the resultant color data to the destination device to produce the resultant color.

40. The system of claim 27, further including:

a destination interface, coupled to the second converting means, to supply the resultant data to a destination device to produce the resultant image.

41. A computer-implemented method of processing a color graphic image comprising the steps of:

generating color data in a first device-dependent color space, said color data representing colors in a color graphic image;

arranging the color data into a color data structure, the color data structures including a colorspace field, a colorset field, a colorprofile field and a color data field, the color data structures being arranged to store color data associated with a color space which may be one on a variety of color spaces including algorithmic and indexed color spaces, wherein the colorspace field contains an indication of the color space if the source color space is an algorithmic color space, the colorset field contains an indication of possible indexed colors if the source color space is an indexed color space; and the colorprofile field can contain a characterization of the color space; and wherein the color data structure contains an indication of the device-dependent color space, the use of the color data structure enabling there to be derived corresponding colors in a device-independent color space, corresponding to the colors in the color graphic image; and processing said color data using said color space data.

42. A color processing system comprising:

means for generating color data in a first device-dependent color space, said color data representing colors in a color graphic image;

means for arranging the color data into a color data structure, the color data structures including field, a colorset field, a colorprofile field and a colordata field, the color data structures being arranged to store color data associated with a color space which may be one of a variety of color spaces including algorithmic and indexed color spaces, wherein the colorspace field contains an indication of the color space if the source color space is an algorithmic color space, the colorset field contains an indication of possible indexed colors if the source color space is an indexed color space, and the colorprofile field can contain a characterization of the color space; and wherein the color data structure contains an indication of the device-dependent color space, the use of the color data structure enabling there to be derived corresponding colors in a device-independent color space, corresponding to the colors in the color graphic image; and means for processing said color data using said color space data.

43. A computer-readable medium containing program instructions for:

arranging the color data into a color data structure, the color data structures including a colorspace field, a colorset field, a colorprofile field and a colordata field, the color data structures being arranged to store color data associated with a color space which may be one of a variety of color spaces including algorithmic and indexed color spaces, wherein the colorspace field contains an indication of the color space if the source color space is an algorithmic color space, the colorset field contains an indication of possible indexed colors if the source color space is an indexed color space, and the colorprofile field can contain a characterization of the color space; and wherein the color data structure contains an indication of the device-dependent color space, the use of the color structure enabling there to be derived corresponding colors in a device-independent color space, corresponding to the colors in the color graphic image; and processing said color data using said color space data.

44. A computer-implemented method of processing a color graphic image comprising the steps of:

a user specifying at least one color graphic image represented by color data in a first color space, an operation to be performed on the color graphic image, and a working color space in which the operation is to be performed, the color data of the color graphic image being arranged into a color data structure, the color data structures including a colorspace field, a colorset field, a colorprofile field and a color data field, the color data structures being arranged to store color data associated with a color space which may be one of a variety of color spaces including algorithmic and indexed color spaces, wherein the colorspace field contains an indication of the color space if the source color space is an algorithmic color space, the colorset field contains an indication of possible indexed colors if the source color space is an indexed color space, and the colorprofile field can contain a characterization of the color space; and performing the operation in the working color space;

wherein the working color space is different from the first color space.

45. A color processing system comprising:

means for a user to specify at least one color graphic image represented by color data in a first color space, an operation to be performed on the color graphic image, and a working color space in which the operation is to be performed, the color data of the color graphic image being arranged into a color data structure, the color data structures including a colorspace field, a colorset field, a colorprofile field and a colordata field, the color data structures being arranged to store color data associated with a color space which may be one of a variety of color spaces including algorithmic and indexed color spaces, wherein the colorspace field contains an indication of the color space if the source color space is an algorithmic color space, the colorset field contains an indication of possible indexed colors if the source color space is an indexed color space, and the colorprofile field can contain a characterization of the color space; and means for performing the operation in the working color space;

wherein the working color space is different from the first color space.

46. A computer-readable medium containing program instructions for:

specifying at least one color graphic image represented by color data in a first color space, an operation to be performed on the color graphic image, and a working color space in which the operation is to be performed, the color data arranged into a color data structure, the color data structures including a colorspace field, a colorset field, a colorprofile field and a color data field, the color data structures being arranged to store color data associated with a color space which may be one of a variety of color spaces including algorithmic and indexed color spaces, wherein the colorspace field contains an indication of the color space if the source color space is an algorithmic color space, the colorset field contains an indication of possible indexed colors if the source color space is an indexed color space, and the colorprofile field can contain a characterization of the color space; and performing the operation in the working color space;

wherein the working color space is different from the first color space.

* * * * *

UNITED STATES PATENT AND TRADEMARK OFFICE
CERTIFICATE OF CORRECTION

PATENT NO. : 5,963,201
DATED : October 5, 1999
INVENTOR(S) : Keith McGreggor, et al.

It is certified that error appears in the above-identified patent and that said Letters Patent is hereby corrected as shown below:

Column 34,
Line 12, delete "colorspace", insert -- color space --, delete "colorset", insert -- color set --, delete "colorprofile, insert -- color profile --;
Line 17, delete "colorspace", insert -- color space --;
Line 19, delete "colorset", insert -- color set --;
Line 21, delete "colorprofile", insert -- color profile --;

Column 35,
Line 10, delete "colorspace", insert -- color space --;
Line 17, delete "colorspace", insert -- color space --;
Line 20, delete "colorprofile", insert -- color profile --;
Line 27, delete "colorspace", insert -- color space --;
Line 28, delete "colorset", insert -- color set --, delete "colorprofile", insert -- color profile --;
Line 32, delete "colorspace", insert -- color space --;
Line 34, delete "colorset", insert -- color set --;
Line 36 and 37, delete "color-space", insert -- color space --;
Line 37, after "field", delete "con", insert -- can --;
Line 41, before "component", insert -- color --;
Line 42, after "in the color", delete "in the color";

Column 36,
Line 46, after "20", insert -- , --;

Column 37,
Line 13, delete "colorspace", insert -- color space --, delete "colorset", insert -- color set --;
Line 14, delete "colorprofile", insert -- color profile --;
Line 18, delete "colorspace", insert -- color space --;
Line 20, delete "colorset", insert -- color set --;
Line 23, delete "colorprofile", insert -- color profile --;

UNITED STATES PATENT AND TRADEMARK OFFICE
CERTIFICATE OF CORRECTION

PATENT NO. : 5,963,201
DATED : October 5, 1999
INVENTOR(S) : Keith McGreggor, et al.

It is certified that error appears in the above-identified patent and that said Letters Patent is hereby corrected as shown below:

Column 38,
Line 30 and 31, delete interme-diate, insert -- inter-mediate --;
Line 57, delete "colorspace", insert -- color space --;
Line 58, delete "colorset", insert-- color set --, delete colorprofile", insert -- colorprofile --;
Line 60, after "one", delete "on", insert -- of --;
Line 62, delete "colorspace", insert -- color space --;
Line 64, delete, "colorset", insert -- color set --;
Line 67, delete, "colorprofile", insert -- color profile --;

Column 39,
Line 14, delete "colorset", insert --color set --, delete "color profile", insert -- color profile --, delete "colordata", insert -- color data --;
Line 18, delete, "colorspace", insert --color space --;
Line 20, delete "colorset", insert -- color set --
Line 23, delete "colorprofile", insert -- color profile --;
Line 33, after the semi-colon (;), insert -- generating color data in a first device-dependent: color space, said color data representing colors in a color graphic image; --;
Line 35, delete "colorspace", insert -- color space --;
Line 36, delete "colorset", insert --color set--, delete "colorprofile", insert -- colorpfile --, delete "colordata", insert -- color data--;
Line 40, delete "colorspace", insert -- color space --;
Line 42, delete "colorset", insert -- color set --;
Line 45, delete "colorprofile", insert -- color profile --;
Line 48, after "color", insert -- data --;
Line 61, delete "colorspace", insert -- color space --, delete "colorset", insert -- color set --;

UNITED STATES PATENT AND TRADEMARK OFFICE
CERTIFICATE OF CORRECTION

PATENT NO. : 5,963,201
DATED : October 5, 1999
INVENTOR(S) : Keith McGreggor, et al.

It is certified that error appears in the above-identified patent and that said Letters Patent is hereby corrected as shown below:

<u>Column 40,</u>
Line 1, delete "colorprofile", insert -- color profile --;
Line 5, delete "colorspace", insert -- color space --;
Line 7, delete "colorset", insert -- color set ---;
Line 9, delete "colorprofile", insert -- color profile --;
Lines 22 and 23, delete "color-space", insert -- color space --;
Line 23, delete "colorset", insert -- color set --, delete "colorprofile", insert -- color profile --;
Line 24, delete "colordata", insert -- color data --;
Line 28, delete "colorspace", insert-- color space --;
Line 30, delete "colorset", insert -- color set --;
Line 32, delete "colorprofile", insert -- color profile --;
Line 45, delete "colorspace", insert -- color space --;
Line 46, delete "colorset", insert -- color set --, delete "colorprofile", insert -- color profile --;
Line 50, delete "colorspace", insert -- color space --;
Line 52, delete "colorset", insert -- color set --;
Line 55, delete "colorprofile", insert -- color profile --.

Signed and Sealed this

Eleventh Day of September, 2001

*Attest:*

*Attesting Officer*

NICHOLAS P. GODICI
*Acting Director of the United States Patent and Trademark Office*